(12) United States Patent
Booher et al.

(10) Patent No.: US 10,869,423 B2
(45) Date of Patent: Dec. 22, 2020

(54) KITS, SYSTEMS, AND METHODS FOR SPRAYERS

(71) Applicants: Steven R. Booher, Carmel, IN (US); Gary A. Vandenbark, Greenfield, IN (US); Mike Hilligoss, Zionsville, IN (US)

(72) Inventors: Steven R. Booher, Carmel, IN (US); Gary A. Vandenbark, Greenfield, IN (US); Mike Hilligoss, Zionsville, IN (US)

(*) Notice: Subject to any disclaimer, the term of this patent is extended or adjusted under 35 U.S.C. 154(b) by 129 days.

(21) Appl. No.: 16/274,833

(22) Filed: Feb. 13, 2019

(65) Prior Publication Data

US 2019/0246557 A1 Aug. 15, 2019

Related U.S. Application Data

(60) Provisional application No. 62/630,139, filed on Feb. 13, 2018, provisional application No. 62/713,457, filed on Aug. 1, 2018.

(51) Int. Cl.
| | |
|---|---|
| *A01C 23/00* | (2006.01) |
| *A01C 23/04* | (2006.01) |
| *G05D 1/02* | (2020.01) |
| *A01B 79/00* | (2006.01) |
| *A01M 7/00* | (2006.01) |

(Continued)

(52) U.S. Cl.
CPC .......... *A01C 23/007* (2013.01); *A01B 79/005* (2013.01); *A01C 23/047* (2013.01); *A01M 7/0089* (2013.01); *G05D 1/0278* (2013.01); *B05B 1/3053* (2013.01); *B05B 12/12* (2013.01);

(Continued)

(58) Field of Classification Search
CPC ....... A01C 23/007; A01C 23/008; B05B 1/20; B05B 12/004; B05B 12/006
See application file for complete search history.

(56) References Cited

U.S. PATENT DOCUMENTS 3,782,634 A * 1/1974 Herman .................... E01H 3/02
239/156
3,933,277 A * 1/1976 Volat .................. A01M 7/0089
222/627

(Continued)

*Primary Examiner* — Viet Le
(74) *Attorney, Agent, or Firm* — Roberts IP Law; John Roberts

(57) ABSTRACT

Kits for sprayer vehicles may include electrically-actuatable solenoids configured to selectably turn individual nozzle assemblies on and off when installed in ports from which check valves were removed, one or more wirelessly-controllable solenoid controllers, a first wiring harness to electrically connect the electrically-actuatable solenoids to the controller(s), a GPS antenna system that wirelessly communicates information identifying its position, bracketry configured to attach the GPS antenna system and the one or more controllers with the sprayer vehicle, a second wiring harness to electrically connect the controller(s) and the GPS antenna system with a source of electrical power on the vehicle, and a mobile device configured to wirelessly cause the one or more controllers to turn individual nozzle assemblies on and off based on a comparison of predetermined geographical boundaries and predefined relative positions of the individual nozzle assemblies to real-time location information received wirelessly from the GPS antenna system.

6 Claims, 14 Drawing Sheets

(51) Int. Cl.
  *B05B 1/30* (2006.01)
  *B05C 11/10* (2006.01)
  *B05B 12/12* (2006.01)

(52) U.S. Cl.
  CPC .. *B05C 11/1015* (2013.01); *G05D 2201/0201* (2013.01)

(56) References Cited

U.S. PATENT DOCUMENTS

| | | | |
|---|---|---|---|
| 4,121,767 A | 10/1978 | Jensen | |
| 4,260,107 A * | 4/1981 | Jackson | A01M 7/0089 239/124 |
| 4,523,280 A | 6/1985 | Bachman | |
| 4,530,463 A * | 7/1985 | Hiniker | B05B 9/06 239/155 |
| 4,553,702 A | 11/1985 | Coffee et al. | |
| 4,630,773 A * | 12/1986 | Ortlip | A01O 17/006 239/1 |
| 4,703,891 A | 11/1987 | Jackson et al. | |
| 4,967,957 A | 11/1990 | Bachman | |
| 4,991,341 A | 2/1991 | Douglas | |
| 4,997,129 A | 3/1991 | Waldrum | |
| 5,134,961 A | 8/1992 | Giles et al. | |
| 5,170,820 A | 12/1992 | Ward | |
| 5,220,876 A | 6/1993 | Monson et al. | |
| 5,260,875 A | 11/1993 | Tofte et al. | |
| 5,334,987 A | 8/1994 | Teach | |
| 5,348,226 A | 9/1994 | Heiniger et al. | |
| 5,407,134 A | 4/1995 | Thompson et al. | |
| 5,520,333 A * | 5/1996 | Tofte | A01B 79/005 137/599.05 |
| 5,704,546 A | 1/1998 | Henderson et al. | |
| 5,809,440 A | 9/1998 | Beck et al. | |
| 5,911,362 A * | 6/1999 | Wood | A01M 7/0089 239/1 |
| 5,913,915 A | 6/1999 | McQuinn | |
| 5,934,561 A | 8/1999 | Knight | |
| 5,950,921 A | 9/1999 | Cain et al. | |
| 5,971,294 A * | 10/1999 | Thompson | B05B 12/04 239/163 |
| 5,991,687 A | 11/1999 | Hale et al. | |
| 5,995,902 A | 11/1999 | Monson | |
| 6,062,496 A * | 5/2000 | Kinter | A01M 7/0089 239/462 |
| 6,087,984 A | 7/2000 | Keller et al. | |
| 6,122,581 A | 9/2000 | McQuinn | |
| 6,161,772 A | 12/2000 | Anfindsen | |
| 6,230,091 B1 | 5/2001 | McQuinn | |
| 6,285,938 B1 | 9/2001 | Lang et al. | |
| 6,353,409 B1 | 3/2002 | Keller et al. | |
| 6,463,374 B1 | 10/2002 | Keller et al. | |
| 6,505,124 B2 | 1/2003 | Carr et al. | |
| 6,510,367 B1 | 1/2003 | McQuinn | |
| 6,669,105 B2 | 12/2003 | Bryan et al. | |
| 6,726,120 B2 | 4/2004 | Schaffter et al. | |
| 6,813,544 B2 | 11/2004 | Hood et al. | |
| 6,883,726 B2 | 4/2005 | Polk et al. | |
| 6,926,211 B2 | 8/2005 | Bryan et al. | |
| 7,103,451 B2 | 9/2006 | Seal et al. | |
| 7,162,961 B2 | 1/2007 | Grimm et al. | |
| 7,184,859 B2 | 2/2007 | Hood et al. | |
| 7,213,772 B2 | 5/2007 | Bryan et al. | |
| 7,278,294 B2 | 10/2007 | Giles | |
| 7,311,004 B2 | 12/2007 | Giles | |
| 7,362,439 B2 | 4/2008 | Franzen et al. | |
| 7,502,665 B2 | 3/2009 | Giles et al. | |
| 7,665,348 B2 | 2/2010 | Giles | |
| 7,706,926 B2 | 4/2010 | Peterson | |
| 7,742,842 B2 | 6/2010 | Giles et al. | |
| 7,826,930 B2 | 11/2010 | Giles et al. | |
| 7,911,616 B2 | 3/2011 | Franzen et al. | |
| 7,929,141 B2 | 4/2011 | Franzen et al. | |
| 7,975,981 B2 | 7/2011 | Harrison, Jr. | |
| 8,131,432 B2 | 3/2012 | Senneff et al. | |
| 8,160,782 B2 | 4/2012 | Harrison, Jr. | |
| 8,160,851 B2 | 4/2012 | Schick et al. | |
| 8,170,849 B2 | 5/2012 | Schick et al. | |
| 8,180,560 B2 | 5/2012 | Harrison, Jr. | |
| 8,191,795 B2 | 6/2012 | Grimm et al. | |
| 8,204,654 B2 | 6/2012 | Sachs et al. | |
| 8,209,075 B2 | 6/2012 | Senneff et al. | |
| 8,250,907 B2 | 8/2012 | Giles | |
| 8,265,835 B2 | 9/2012 | Peterson et al. | |
| 8,346,443 B2 | 1/2013 | Senneff et al. | |
| 8,469,286 B2 | 6/2013 | Robinson, Jr. | |
| 8,482,736 B2 | 7/2013 | Franzen et al. | |
| 8,505,566 B2 | 8/2013 | Nguyen | |
| 8,571,764 B2 | 10/2013 | Peterson et al. | |
| 8,611,366 B2 | 12/2013 | Harrison, Jr. | |
| 8,635,011 B2 | 1/2014 | Senneff et al. | |
| 8,666,611 B2 | 3/2014 | Peterson et al. | |
| 8,740,177 B2 | 6/2014 | Walker | |
| 8,777,707 B2 | 7/2014 | Hoyle | |
| 8,864,053 B2 * | 10/2014 | Anderton | B05B 1/30 239/456 |
| 8,868,300 B2 * | 10/2014 | Kocer | A01C 21/005 701/50 |
| 8,880,362 B2 * | 11/2014 | Wilkens | B05B 9/06 702/47 |
| 8,924,030 B2 | 12/2014 | Wendte et al. | |
| 8,965,643 B2 | 2/2015 | Peterson et al. | |
| 9,046,895 B2 * | 6/2015 | Orr | E02F 9/24 |
| 9,113,591 B2 * | 8/2015 | Shivak | A01O 23/042 |
| 9,127,241 B2 | 9/2015 | Hodge et al. | |
| 9,339,023 B2 | 5/2016 | Ballu | |
| 9,380,773 B2 | 7/2016 | Hebbert et al. | |
| 9,445,540 B2 * | 9/2016 | Ballu | A01M 7/0089 |
| 9,504,212 B2 | 11/2016 | Michael et al. | |
| 9,532,563 B2 | 1/2017 | Arenson et al. | |
| 9,539,674 B2 | 1/2017 | Walker | |
| 9,580,256 B2 | 2/2017 | Wagers et al. | |
| 9,661,809 B2 | 5/2017 | Chiocco et al. | |
| 9,781,916 B2 | 10/2017 | Preheim et al. | |
| 9,795,977 B2 | 10/2017 | Grimm et al. | |
| 9,851,718 B2 | 12/2017 | Booher | |
| 10,369,585 B2 * | 8/2019 | Brooks | A01M 7/0042 |
| 10,485,229 B2 * | 11/2019 | Hammer | A01M 7/0089 |
| 2002/0099471 A1 * | 7/2002 | Benneweis | A01C 21/005 700/237 |
| 2003/0111546 A1 | 6/2003 | Schaffter | |
| 2003/0132310 A1 | 7/2003 | Polk et al. | |
| 2003/0187560 A1 | 10/2003 | Keller | |
| 2004/0217199 A1 | 11/2004 | Bryan et al. | |
| 2005/0000277 A1 | 1/2005 | Giles | |
| 2005/0024213 A1 | 2/2005 | Franzen | |
| 2005/0038568 A1 | 2/2005 | Hood | |
| 2006/0151680 A1 | 7/2006 | Franzen | |
| 2006/0225489 A1 | 10/2006 | Giles | |
| 2006/0273189 A1 * | 12/2006 | Grimm | B05B 9/0423 239/146 |
| 2008/0114497 A1 | 5/2008 | Giles et al. | |
| 2008/0114498 A1 | 5/2008 | Giles et al. | |
| 2008/0230624 A1 | 9/2008 | Giles et al. | |
| 2008/0251600 A1 | 10/2008 | Sorensen | |
| 2008/0307893 A1 | 12/2008 | Giles | |
| 2008/0316491 A1 | 12/2008 | Franzen et al. | |
| 2009/0037041 A1 | 2/2009 | Senneff | |
| 2009/0037096 A1 | 2/2009 | Senneff | |
| 2009/0050704 A1 | 2/2009 | Harrison, Jr. | |
| 2009/0050705 A1 | 2/2009 | Harrison, Jr. | |
| 2009/0050831 A1 | 2/2009 | Harrison, Jr. | |
| 2009/0054997 A1 | 2/2009 | Harrison, Jr. | |
| 2009/0112372 A1 | 4/2009 | Peterson | |
| 2009/0132132 A1 | 5/2009 | Peterson et al. | |
| 2009/0192654 A1 | 7/2009 | Wendte | |
| 2009/0216406 A1 | 8/2009 | Senneff | |
| 2009/0240430 A1 | 9/2009 | Sachs | |
| 2010/0121616 A1 | 5/2010 | Schick et al. | |
| 2010/0121620 A1 | 5/2010 | Schick et al. | |
| 2010/0132439 A1 | 6/2010 | Giles | |
| 2011/0015832 A1 | 1/2011 | Hoyle | |
| 2011/0054743 A1 | 3/2011 | Kocer | |

(56) References Cited

U.S. PATENT DOCUMENTS

| | | |
|---|---|---|
| 2011/0077784 A1* | 3/2011 | Lips ............... A01O 23/007 |
| | | 700/283 |
| 2011/0139899 A1 | 6/2011 | Robinson, Jr. |
| 2011/0235043 A1 | 9/2011 | Franzen et al. |
| 2011/0248104 A1 | 10/2011 | Malsam |
| 2013/0153676 A1* | 6/2013 | Ballu ............... A01C 23/007 |
| | | 239/11 |
| 2013/0292487 A1 | 11/2013 | Ballu |
| 2014/0070019 A1 | 3/2014 | Chiocco |
| 2014/0263709 A1* | 9/2014 | Kocer ............... B05B 13/005 |
| | | 239/11 |
| 2014/0277780 A1* | 9/2014 | Jensen ............. B05B 12/085 |
| | | 700/283 |
| 2014/0277781 A1 | 9/2014 | Mangen et al. |
| 2015/0027043 A1 | 1/2015 | Redden |
| 2017/0106386 A1* | 4/2017 | Milo ................ B05B 13/005 |
| 2017/0120263 A1* | 5/2017 | Needham .......... B05B 1/3053 |
| 2017/0274400 A1* | 9/2017 | Kowalchuk ........ B05B 12/082 |
| 2018/0139895 A1* | 5/2018 | Brechon ........... A01O 23/007 |
| 2019/0098888 A1* | 4/2019 | Murphy ............ B05B 12/004 |
| 2019/0124827 A1* | 5/2019 | Davis ............. B05B 12/1418 |
| 2019/0257678 A1* | 8/2019 | Posselius .......... B05B 12/004 |
| 2019/0321844 A1* | 10/2019 | Schrader ............ H01F 7/064 |

\* cited by examiner

KITS, SYSTEMS, AND METHODS FOR SPRAYERS

CROSS-REFERENCE TO RELATED APPLICATIONS

The present application claims priority to, incorporates herein by reference, and is a non-provisional of, U.S. provisional patent application Ser. No. 62/630,139 filed Feb. 13, 2018 by inventors Steven R. Booher, Gary A. Vandenbark, and Mike Hilligoss, and entitled Kits, Systems, and Methods for Sprayers (herein "the '139 application"). The present application also claims priority to, incorporates herein by reference, and is a non-provisional of, U.S. provisional patent application Ser. No. 62/713,457 filed Aug. 1, 2018 by inventor Gary A. Vandenbark and entitled Sprayer Systems, Kits, and Methods of Use (herein "the '457 application").

FEDERALLY SPONSORED RESEARCH OR DEVELOPMENT

None.

TECHNICAL FIELD

The present disclosure relates generally to spraying, and in particular to agricultural spraying with vehicle-mounted spraying equipment, as well as kits, systems, and methods regarding same. Such spraying includes, for example but not by way of limitation, horticulture and ground maintenance spraying.

BACKGROUND

Sprayer vehicles, or vehicles with spraying equipment mounted to them, are known and the details of their typical components and functions are not repeated here, except where incorporated by reference.

U.S. Pat. No. 5,334,987 to Teach ("Teach"), incorporated herein by reference, discusses an aircraft control system for applying chemicals to an agricultural field in connection with certain predetermined flight patterns. A global positioning system receiver receives radio frequency signals from satellites and the position of the aircraft is determined from the information contained in the received signals. An aircraft computer stores the surface coordinates of the field to be sprayed. The aircraft pilot enters into the computer the desired orientation, swath width and track width of the flight pattern. The computer then produces a flight pattern having the desired orientation, and during flight generates audible signals representative of amount and direction of deviation from the desired flight pattern. The computer also automatically activates and deactivates chemical spraying upon entering and exiting, respectfully, the airspace above the field. The system discussed in Teach involves hardware and software specific to aviation and integrated into an airplane, and, among other drawbacks, does not turn individual sprayer nozzles on and off independently, nor does it turn off any of its sprayer mechanism when the pilot overlaps previously-sprayed areas.

U.S. Pat. No. 5,704,546 to Henderson, et al. ("Henderson"), incorporated herein by reference, discusses a complex integrated position-responsive control system and method for a sprayer, purporting to provide droplet size control, drift reduction, spray transport modeling and gradients of application rates to avoid drift (e.g., Col. 3, lines 35-39). The position-responsive control system monitors the position of a spray vehicle, and changes the spray system operating conditions in response to the sprayer vehicle position. The control system includes a setpoint conversion subroutine for independently controlling the flow rate and volume median droplet size setpoints. The control system also includes performance envelopes for various nozzle tips. An independent flow rate and droplet size control method is provided for use with the control system. A position-responsive control system receives information pertaining to the boundaries of spray zones and spray conditions, such as application rates and volume median droplet diameters associated with the spray zones. Henderson's system is complex and would be expensive to implement, especially on existing sprayer vehicles that do not already include the specialized equipment required by Henderson.

A need remains for a sprayer control system with advanced features that is inexpensive and easy to implement with few component changes, including as kits readily adaptable to numerous existing sprayer vehicles.

SUMMARY

The present invention elegantly overcomes various drawbacks and limitations of past systems and provides numerous additional benefits as will be apparent to persons of skill in the art. For example, provided in various example embodiments is a kit configured to be added-on to a vehicle having a source of electrical power and a spraying system comprising a tank for holding a liquid to be sprayed and a plurality of spaced-apart nozzle assemblies in liquid communication with the tank, each nozzle assembly comprising a check valve removably installed in a port in each respective nozzle assembly. Example kits may comprise a plurality of electrically-actuatable solenoids configured to be installed in the ports upon removal of the check valves and to selectably turn on and off flow of the liquid through the nozzle assemblies when the plurality of electrically-actuatable solenoids are installed in the ports. Example kits may comprise one or more controllers configured to be in electrical communication with the plurality of electrically-actuatable solenoids and to electrically actuate the solenoids to selectably turn on and off flow of the liquid through the nozzle assemblies when the plurality of electrically-actuatable solenoids are installed in the ports. Example kits may comprise a first wiring harness configured to be attached to the vehicle and to electrically connect the one or more controllers with the plurality of electrically-actuatable solenoids. Example kits may comprise a GPS antenna system. Example kits may comprise bracketry configured to attach the GPS antenna system and the one or more controllers with the vehicle. Example kits may comprise a second wiring harness configured to be attached to the vehicle and to electrically connect the one or more controllers and the GPS antenna system with the source of electrical power. Example kits may comprise a mobile device configured to be in wireless communication with the GPS antenna system and the one or more controllers, to receive geographic location information from the GPS antenna system, and to process the geographic location information in view of one or more databases of information comprising map data defining spray regions and no-spray regions and vehicle data defining the locations of each of the nozzle assemblies relative to the location of the GPS antenna system when installed on the vehicle, and based thereon wirelessly communicate on and off signals to the one or more controllers to individually turn on and off flow of the liquid through each of the individual nozzle assemblies based on whether each nozzle assembly is within a spray region or a no-spray region. Example kits may comprise second bracketry configured to attach the mobile device with the vehicle near a driver's location on the vehicle. Example kits may comprise a third wiring harness configured to be attached to the vehicle and to electrically connect the mobile device with the source of electrical power when the mobile device is attached with the vehicle near the driver's location on the vehicle. In various example embodiments of Example kits, the mobile device may be configured to update the map data in real-time during use of the vehicle to redefine the spray regions as no-spray regions as the spray regions are sprayed by the vehicle.

Also provided in various example embodiments is a method of installing a kit as described herein, comprising the steps of: providing the vehicle and the kit; removing the check valves from the ports in the nozzle assemblies; installing the plurality of electrically-actuatable solenoids in the ports; attaching with the bracketry the GPS antenna system and the one or more controllers with the vehicle; connecting with the first wiring harness the one or more controllers with the plurality of electrically-actuatable solenoids; attaching the first wiring harness to the vehicle; connecting with the second wiring harness the one or more controllers and the GPS antenna system with the source of electrical power; attaching the second wiring harness to the vehicle; and entering vehicle data into the one or more databases defining the locations of each of the nozzle assemblies relative to the location of the GPS antenna system when installed on the vehicle. In various example embodiments a method of installing a kit as described herein may further comprise the steps of entering map data into the one or more databases defining spray regions and no-spray regions. In various example embodiments the step of entering map data into the one or more databases defining spray regions and no-spray regions may comprise the steps of driving the vehicle along one or more edges of one or more spray regions or no-spray regions and recording travel path data transmitted from the GPS antenna system to the mobile device. In various example embodiments the step of entering map data into the one or more databases defining spray regions and no-spray regions may comprise the steps of directing a vehicle, other than the vehicle previously described, and having a second GPS antenna system, along one or more edges of one or more spray regions or no-spray regions and recording travel path data transmitted from the second GPS antenna system to the mobile device. In various example embodiments the step of entering map data into the one or more databases defining spray regions and no-spray regions may comprise the steps of delineating one or more edges of one or more spray regions or no-spray regions on a GUI overlay of a digital image of a map. In various example embodiments the step of entering map data into the one or more databases defining spray regions and no-spray regions may comprise the steps of downloading at least a portion of the map data wirelessly from the cloud to the mobile device.

Further provided in various example embodiments is a vehicle having a source of electrical power, and a spraying system comprising: a tank for holding a liquid to be sprayed; a plurality of spaced-apart nozzle assemblies in liquid communication with the tank, each nozzle assembly comprising an electrically-actuatable solenoid configured to selectably turn on and off flow of the liquid through the nozzle assembly; one or more controllers in electrical communication with the plurality of electrically-actuatable solenoids and configured to electrically actuate the solenoids to selectably turn on and off flow of the liquid through the nozzle assemblies; first wiring attached to the vehicle and electrically connecting the one or more controllers with the plurality of electrically-actuatable solenoids; a GPS antenna system; bracketry attaching the GPS antenna system and the one or more controllers with the vehicle; second wiring attached to the vehicle and electrically connecting the one or more controllers and the GPS antenna system with the source of electrical power; and a mobile device attached with the vehicle and in wireless communication with the GPS antenna system and the one or more controllers, the mobile device configured to receive geographic location information from the GPS antenna system and to process the geographic location information in view of one or more databases of information comprising map data defining spray regions and no-spray regions and vehicle data defining the locations of each of the nozzle assemblies relative to the location of the GPS antenna system, and based thereon wirelessly communicate on and off signals to the one or more controllers to individually turn on and off flow of the liquid through each of the individual nozzle assemblies based on whether each nozzle assembly is within a spray region or a no-spray region. In various example embodiments the vehicle may further comprise second bracketry attaching the mobile device with the vehicle near a driver's location on the vehicle, and wiring attached to the vehicle and electrically connecting the mobile device with the source of electrical power. In various example embodiments the mobile device may be configured to update the map data in real-time during use of the vehicle to redefine the spray regions as no-spray regions as the spray regions are sprayed by the vehicle.

Additionally provided in various example embodiments is a method of using a vehicle as described herein, comprising the steps of providing the vehicle and causing the mobile device to, at a first time, wirelessly communicate signals to the one or more controllers to individually turn on or allow flow of the liquid through each of the individual nozzle assemblies, and causing the mobile device to, at a second time, wirelessly communicate signals to the one or more controllers to individually turn off or disallow flow of the liquid through each of the individual nozzle assemblies.

In various example embodiments a method of using a vehicle as described herein may further comprise the steps of entering vehicle data into the one or more databases defining the locations of each of the nozzle assemblies relative to the location of the GPS antenna system when installed on the vehicle. In various example embodiments the steps of entering vehicle data into the one or more databases may comprise the steps of entering map data into the one or more databases defining spray regions and no-spray regions. In various example embodiments the steps of entering vehicle data into the one or more databases may comprise the steps of driving the vehicle along one or more edges of one or more spray regions or no-spray regions and recording travel path data transmitted from the GPS antenna system to the mobile device. In various example embodiments the steps of entering vehicle data into the one or more databases may comprise the steps of directing a vehicle, other than the vehicle previously described, and having a second GPS antenna system, along one or more edges of one or more spray regions or no-spray regions and recording travel path data transmitted from the second GPS antenna system to the mobile device. In various example embodiments the steps of entering vehicle data into the one or more databases may comprise the steps of delineating one or more edges of one or more spray regions or no-spray regions on a GUI overlay of a digital image of a map. In various example embodiments the steps of entering vehicle data into the one or more databases may comprise the steps of delineating one or more edges of one or more spray regions or no-spray regions on a GUI overlay of a digital image of a map appearing on a screen of the mobile device. In various example embodiments the steps of entering vehicle data into the one or more databases may comprise the steps of downloading at least a portion of the map data wirelessly from the cloud to the mobile device.

In various example embodiments a method of using a vehicle as described herein may further comprise the steps of driving the vehicle proximate one or more edges of one or more spray regions or no-spray regions such that one or more of the plurality of spaced-apart nozzle assemblies are positioned within a spray region while other of the plurality of spaced-apart nozzle assemblies are positioned within a no-spray region, and thereby causing the mobile device to wirelessly communicate signals to the one or more controllers to individually turn on or allow flow of the liquid through each of the individual nozzle assemblies positioned in the one or more spray regions, and to individually turn off or disallow flow of the liquid through each of the individual nozzle assemblies positioned in the one or more no-spray regions.

In various example embodiments a method of using a vehicle as described herein may further comprise the steps of driving the vehicle over a boundary between a spray region and a no-spray region such that at the first time the plurality of spaced-apart nozzle assemblies are all positioned within a spray region, and at the second time after the first time the plurality of spaced-apart nozzle assemblies are all positioned within a no spray region, and thereby causing, at the first time, the mobile device to wirelessly communicate signals to the one or more controllers to individually turn on or allow flow of the liquid through each of the individual nozzle assemblies, and causing, at the second time, the mobile device to wirelessly communicate signals to the one or more controllers to individually turn off or disallow flow of the liquid through each of the individual nozzle assemblies.

In various example embodiments a method of using a vehicle as described herein may further comprise the steps of updating the map data in real-time during use of the vehicle and redefining the spray regions as no-spray regions as the spray regions are sprayed by the vehicle. In various example embodiments a method of using a vehicle as described herein may further comprise the steps of viewing on a display on the mobile device a digital image of a map of an area where the vehicle is located, and within that map area, one or more boundaries between the one or more spray regions and the one or more no-spray regions, and also dynamically depicting in real-time those portions of the map area which have been sprayed by the spraying system and those portions of the map area which have not been sprayed by the spraying system.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Examples of the invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

FIG. 1A is a top plan view of an example sprayer vehicle for use with various example embodiments of the invention, shown with its sprayers on.

Figure 1A:
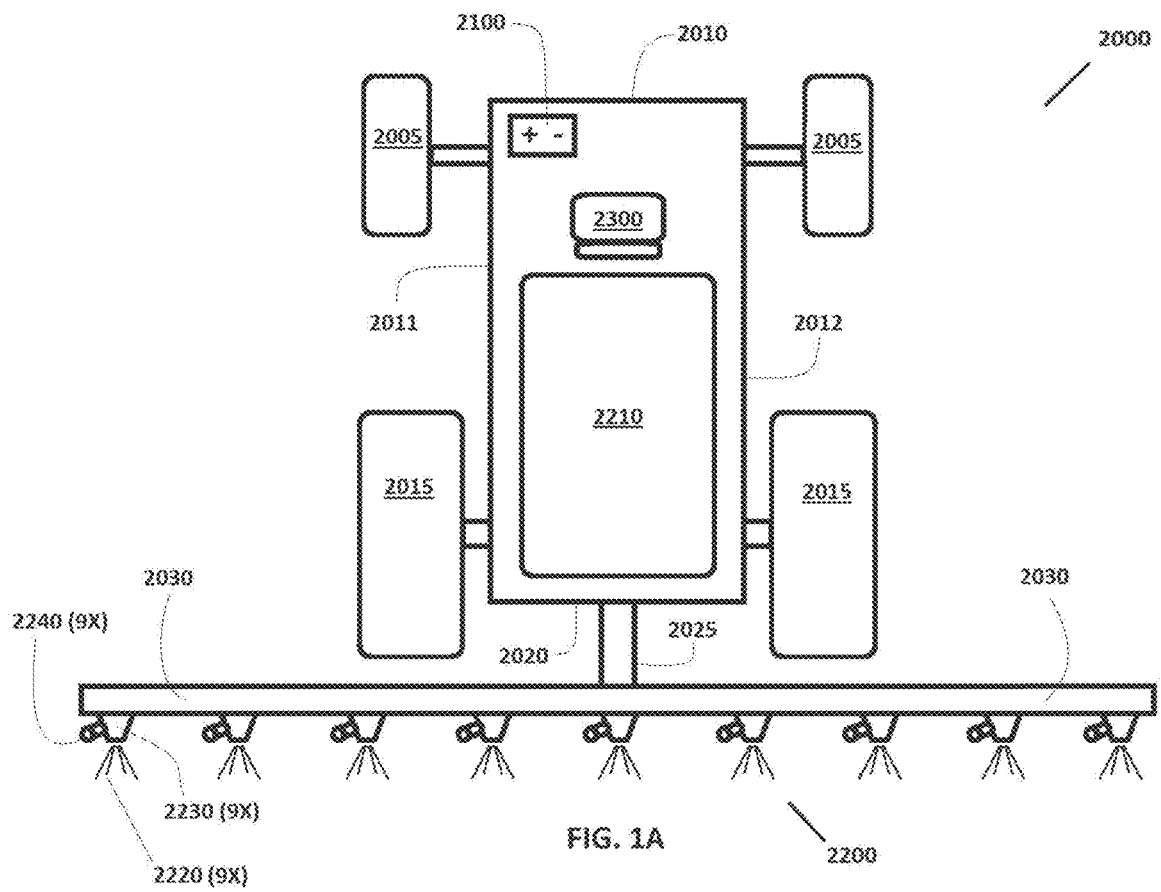

Additionally, the figures, drawings, and photographs in the '139 application, which is incorporated herein by reference for all that it teaches, including its own incorporations by reference, illustrate certain aspects of example embodiments of the invention, wherein: page 14 is a diagram illustrating various example components of an example embodiment; pages 000015 and 000016 provide example details of certain components according to a first example embodiment; pages 000017 and 000018 provide example details of certain components according to a second example embodiment; pages 000019 to 000031 provide information regarding an example installation of certain example components according to an example embodiment; pages 000032 to 000098 provide example views and information regarding one or more screen interfaces as viewable by a user of an example system; pages 000099 to 000147 provide example views and information regarding an example web portal for use in connection with example system embodiments; and pages 000148 to 000182 provide example information regarding software that may be used in connection with example embodiments.

The invention is not limited to what is shown in these example figures. The invention is broader than the examples shown in the figures and covers anything that falls within any of the claims.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1B:
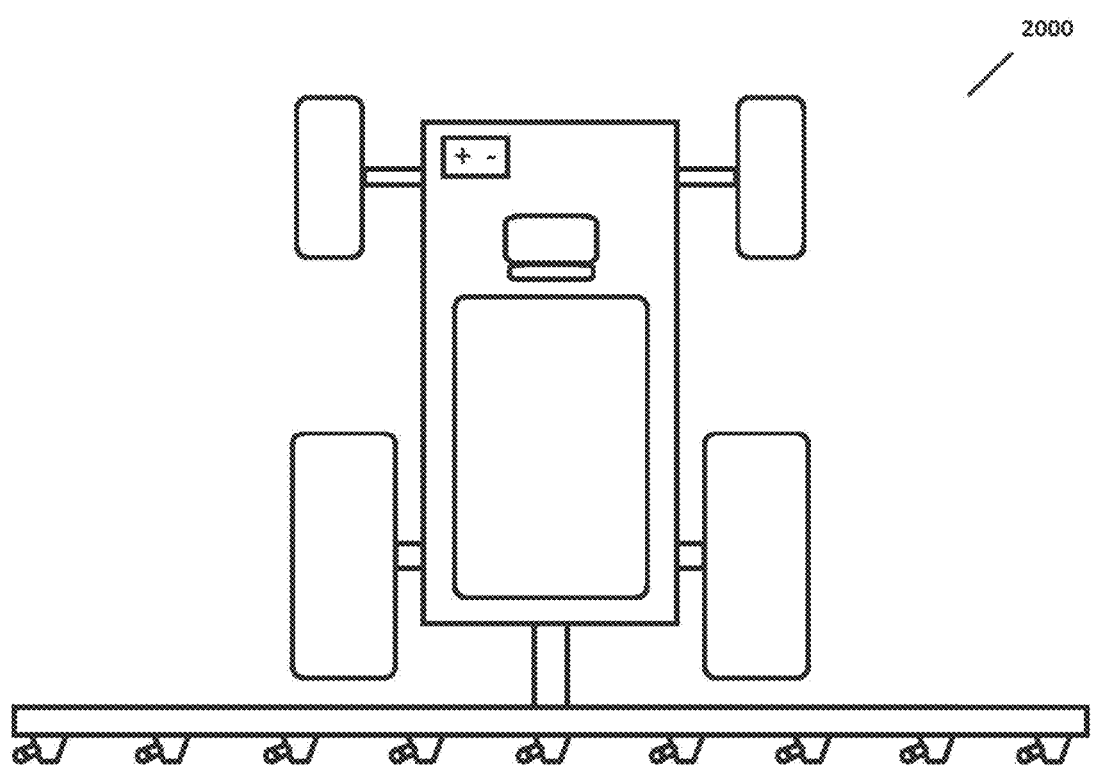
FIG. 1B is a top plan view of the example sprayer vehicle of FIG. 1A, shown with its sprayers off.

Turning first to FIGS. 1A and 1B, depicted is a top plan view of one example embodiment of a conventional sprayer vehicle 2000, shown with the sprayers on (FIG. 1A) and off (FIG. 1B). It is understood that the nature, size, type, layout, orientation, number of wheels or tracks and other details regarding the vehicle 2000, are generally unimportant to the invention except where recited in the claims. Accordingly, a single generic example sprayer vehicle 2000 is used consistently throughout the figures as a backdrop to illustrate possible implementations of the invention, and the details of this example sprayer vehicle 2000 should in no way be used to limit the scope of the invention, except where specifically recited in the claims. For example, sprayer vehicle 2000 includes nine (9) nozzle assemblies 2230; this is entirely arbitrary and is not limiting, as any suitable number of nozzle assemblies 2230 could be used.

With continuing reference to FIGS. 1A and 1B, this particular example sprayer vehicle 2000 is shown having a front end 2010, a back end 2020, a left side 2011, and a right side, 2012, a source of electrical power 2100 (such as a battery, charging system, and the wiring system connected therewith, any of which may be located anywhere on the vehicle), a driver's location 2300 (which may include a seat as shown), and comprising front steerable wheels 2005 near the front end 2010 and rear driven wheels 2015 near the rear end 2020. It is understood that while the wheels 2005 and 2015 appear generally rectangular from this top view, they would appear round in a left side or side view (not shown). This example sprayer 2000 includes a spraying system 2200 comprising a tank 2210 (which while appearing generally rectangular from a top view, might appear round in a front or rear view, not shown) for holding a liquid 2220 (such as water containing chemicals such as fertilizers and the like) to be sprayed by the sprayer vehicle 2000. The spraying system 2200 also includes a laterally-elongated boom 2030 attached to the back end 2020 of the example vehicle 2000 with a mounting structure 2025, the boom 2030 extending laterally beyond the left side 2011 and past the right side 2012. Affixed to the boom 2030 are a plurality (nine (9), in this case) of spaced-apart nozzle assemblies 2230 in liquid communication with the tank 2210. FIG. 1A depicts the nozzle assemblies 2230 spraying the liquid 2220 toward the ground, for instance when the liquid 2220 is being pumped through the nozzle assemblies 2230 from the tank 2210 by a pump (not shown). In contrast, FIG. 1B depicts the same nozzle assemblies 2230 not spraying the liquid 2220 toward the ground, for instance when the liquid 2220 is not being pumped through the nozzle assemblies 2230 from the tank 2210 by a pump (not shown). In this type of embodiment a check valve 2240 may be removably installed in each nozzle assembly, for instance to close off the nozzle assembly 2230 and prevent back-flow into the spraying system 2200 when the liquid 2220 is not being forced through the nozzle assembly 2230.

Figure 2:
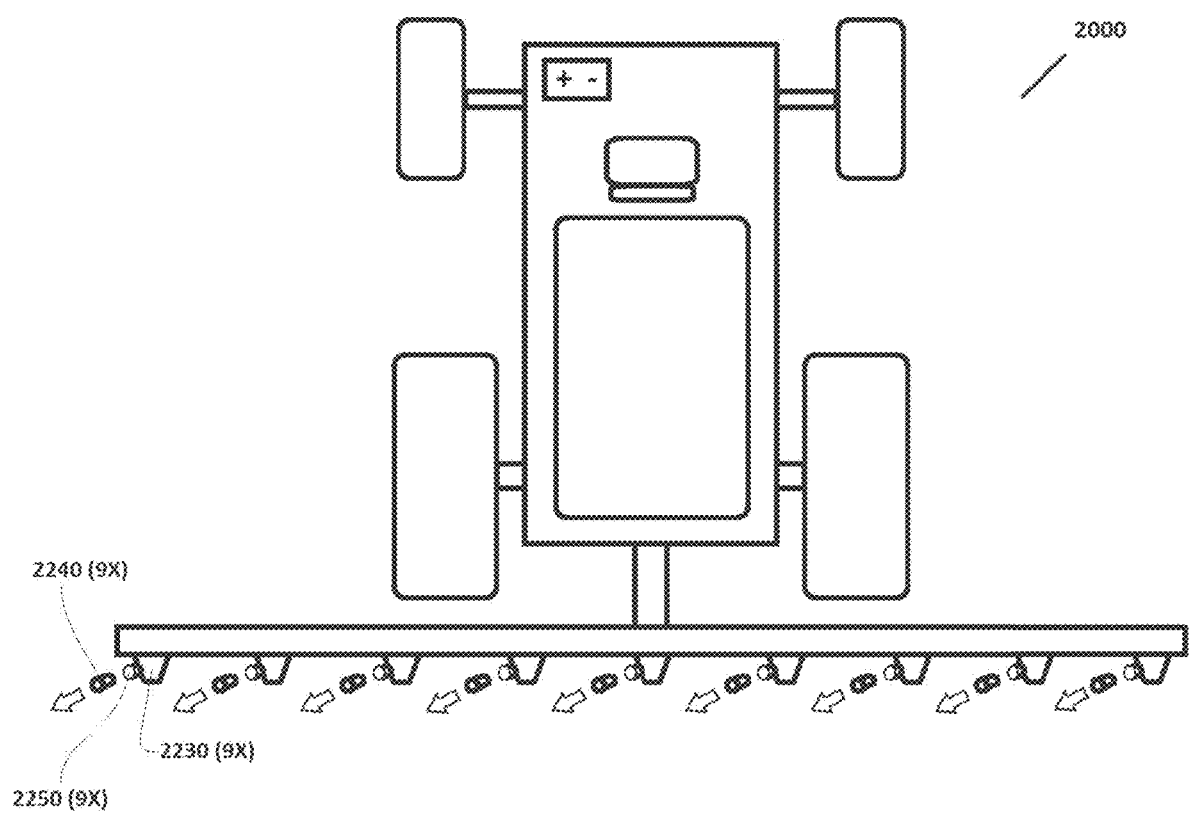
FIG. 2 is a top plan view of the example sprayer vehicle of FIG. 1A, illustrating removal of check valves from ports in the nozzle assemblies.

FIG. 2 illustrates the removal of the check valves 2240 from the ports 2250 in each respective nozzle assembly 2230. Each port 2250 provides access to the flow channel for the liquid 2220 when the liquid 2220 flows through the nozzle assembly 2230. The vehicle 2000 is now ready for the installation of a kit 1000.

Figure 3:
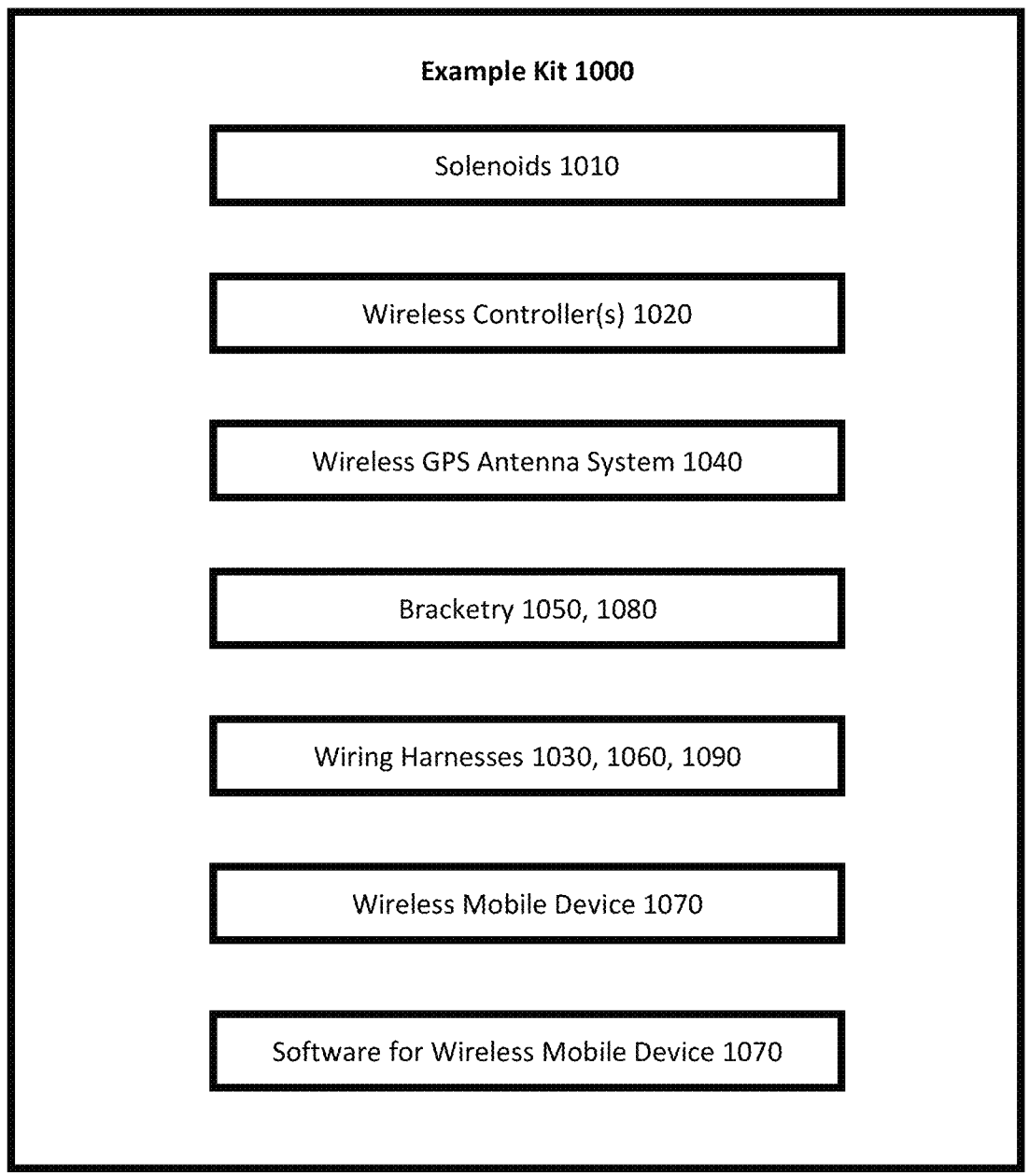
FIG. 3 is a diagram listing example contents of an example kit for sprayer vehicles such as the one shown in FIG. 2, according to various example embodiments.

FIG. 3 illustrates potential contents of an example kit 1000 according to various example embodiments. Such a kit 1000 need not be sold together in a single package to constitute the kit 1000. Rather, the present kits 1000 are constituted any time the individual contents of the kit 1000 are brought together in any way for manufacture, use, sale, or importation. Various aspects of the components identified in FIG. 3 are further described herein, as well as additional and alternative components of kits 1000. Additional details regarding example components of kits 1000 are provided in the '139 application, which is incorporated herein by reference.

Figure 4:
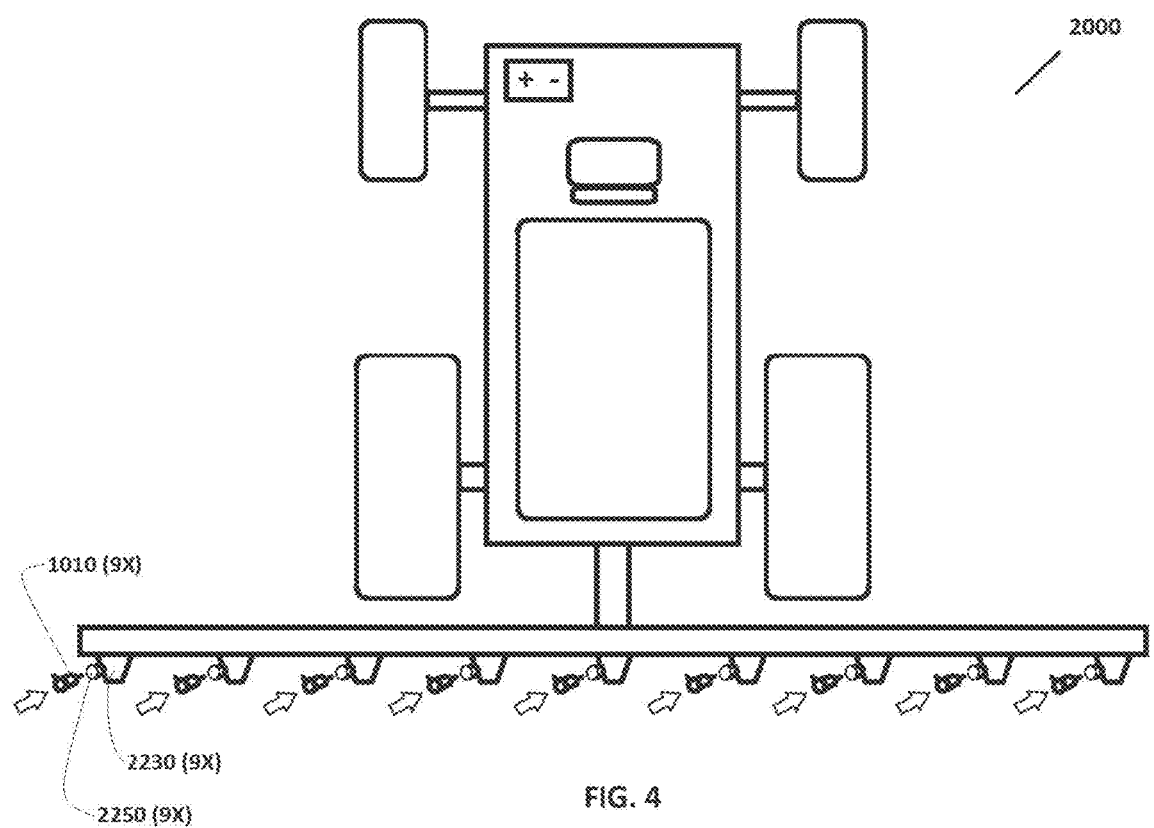
FIG. 4 is a top plan view of the example sprayer vehicle of FIG. 2, illustrating installation of electrically-actuatable solenoids into the ports of the nozzle assemblies from which the check valves were removed.
Figure 5:
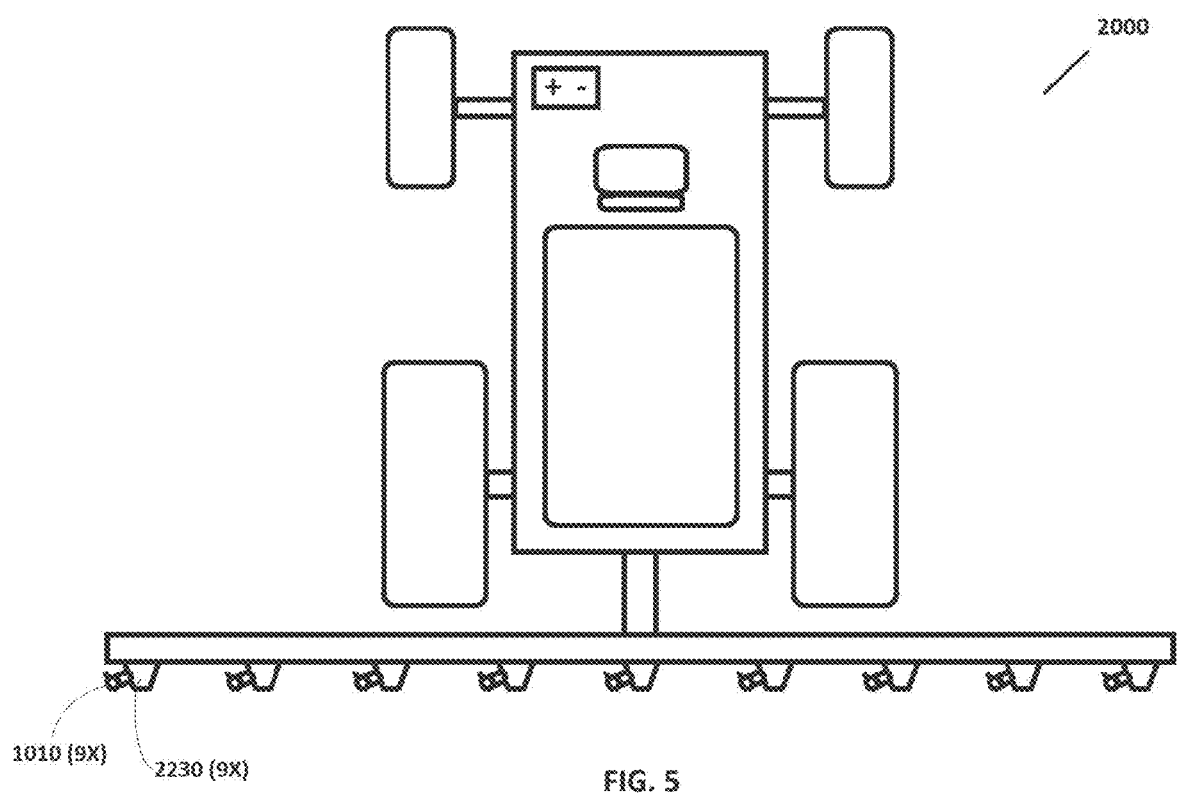
FIG. 5 is a top plan view of the example sprayer vehicle of FIG. 4, illustrating the electrically-actuatable solenoids having been installed into the ports of the nozzle assemblies from which the check valves were removed.

FIGS. 4 and 5 illustrate installing a plurality of electrically-actuatable solenoids 1010 in the ports 2250, with the arrows in FIG. 4 depicting the direction of installation, and FIG. 5 showing the assembly after installation. In various example embodiments, the electrically-actuatable solenoids 1010 may be configured to fit where the check valves 2240 were located in the ports 2250 and to attach with or in the ports 2250 in the same or similar way that the check valves 2240 were attached into the ports 2250 (for instance by threading, or any other suitable attachment means). When so installed, the electrically-actuatable solenoids 1010 can selectably turn individual nozzle assemblies 2230 on and off by retracting and extending, respectively, a retractable member into flow path of the liquid 2220 in the nozzle assemblies 2230.

Figure 6:
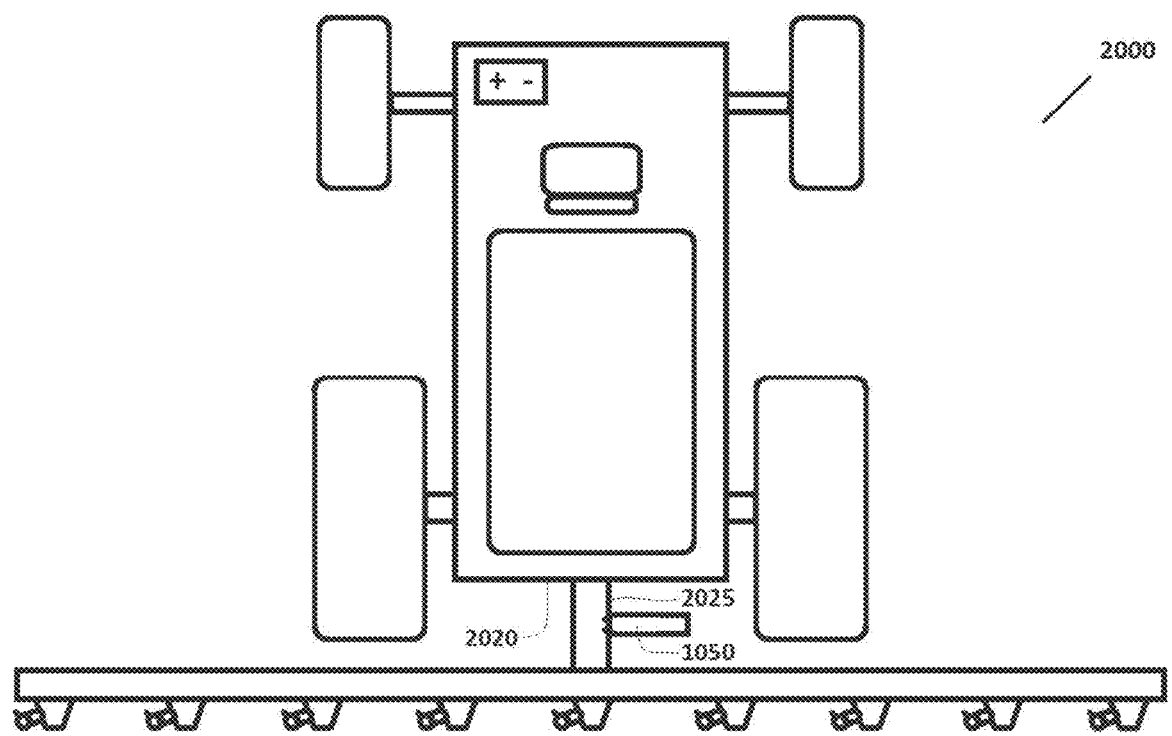
FIG. 6 is a top plan view of the example sprayer vehicle of FIG. 5, illustrating the addition of example first bracketry to a rear portion of the vehicle.
Figure 7:
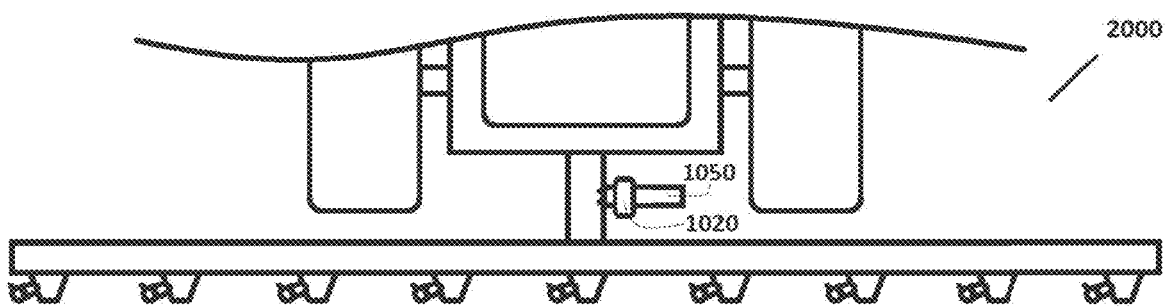
FIG. 7 is a partially cut-away top plan view of the example sprayer vehicle of FIG. 6, illustrating the further addition of one or more example controllers to the first bracketry.
Figure 8:
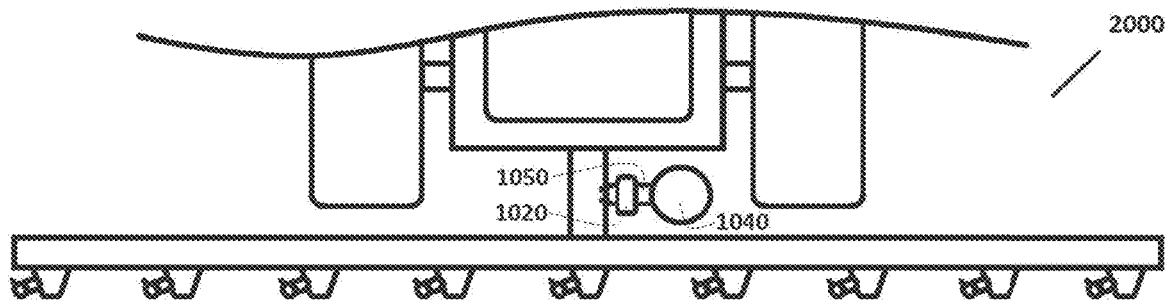
FIG. 8 is a partially cut-away top plan view of the example sprayer vehicle of FIG. 7, illustrating the further addition of an example GPS antenna system to the first bracketry.

FIGS. 6, 7, and 8 illustrate attaching with bracketry 1050 a GPS antenna system 1040 that wirelessly communicates information identifying its position, and one or more wirelessly-controllable solenoid controllers 1020, with the vehicle 2000. Additional details regarding example components, structure, and assembly of bracketry 1050 to example mounting structure 2025 on the rear area 2020 of an example vehicle 200 are provided in the incorporated '139 application. Also provided in the incorporated '139 application are details regarding example wirelessly-controllable solenoid controllers 1020 (including versions with both one and two such controllers 1020), and example GPS antenna systems 1040 that wirelessly communicate information identifying their position. In certain example embodiments of kits 1000, the one or more wirelessly-controllable solenoid controllers 1020 and the wireless GPS antenna system 1040 come pre-assembled to the bracketry 1050, which must merely then be attached to any suitable location on the vehicle, 2000 using hardware provided, such as a plurality of brackets and fasteners. In certain example embodiments of kits 1000, the bracketry 1050 may be provided with adjustment means for adjusting the height of the components attached thereto, such as a plurality of mounting holes to choose from, for instance as shown in the incorporated '139 application. Bracketry 1050 may comprise any suitable number of individual and varied brackets, fasteners, and related components, for instance to facilitate mounting the kit 1000 to a wide variety of different vehicles 2000, and any suitable material may be used for bracketry 1050, such as, for example, steel.

Figure 9:
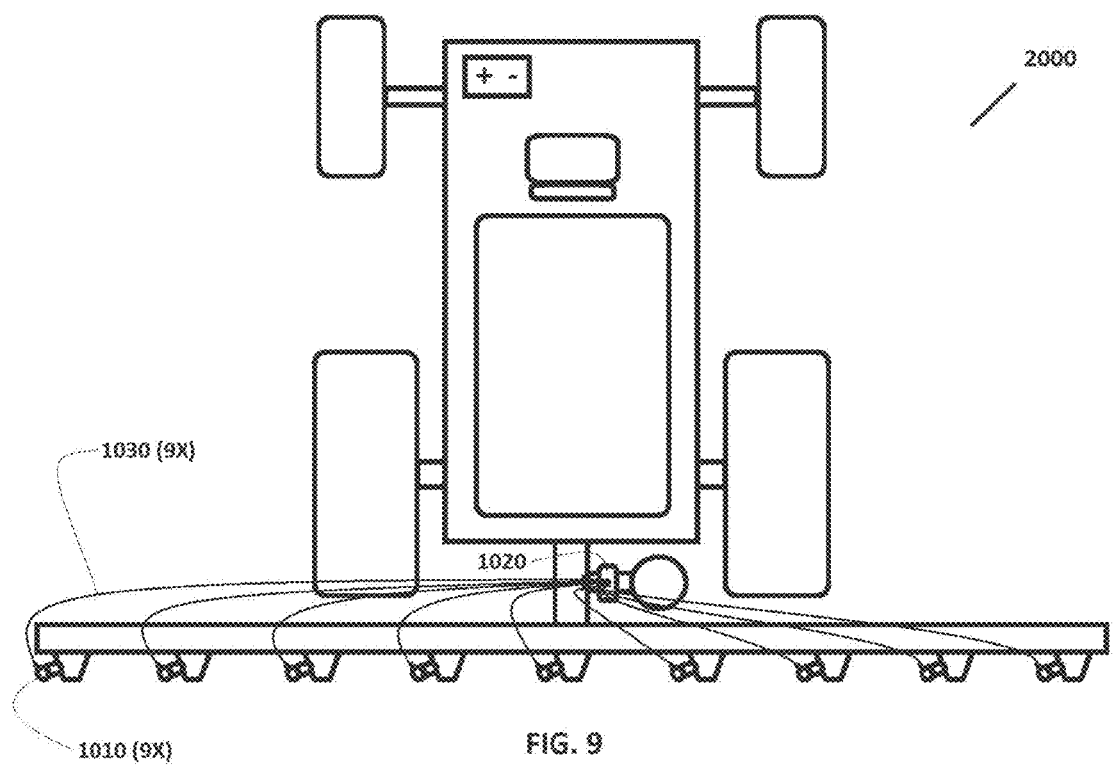
FIG. 9 is a top plan view of the example sprayer vehicle of FIG. 8, illustrating the addition of an example first wiring harness to connect the one or more controllers to the electrically-actuatable solenoids.
Figure 10:
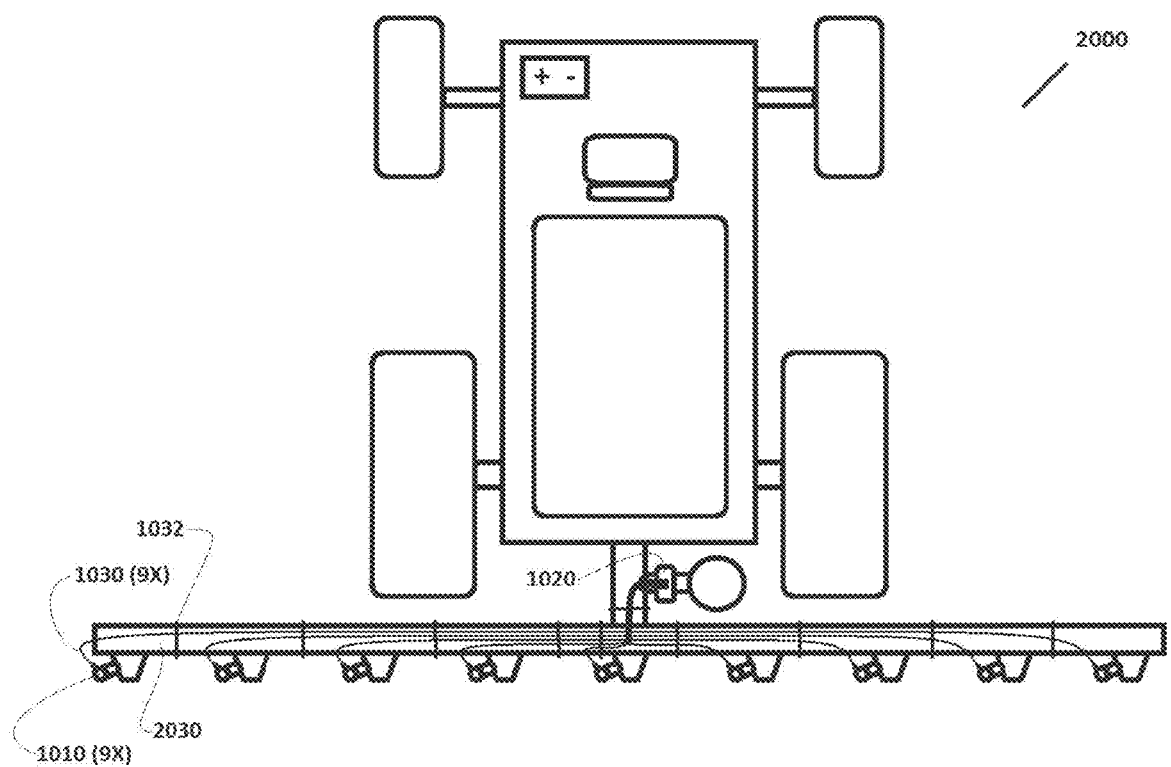
FIG. 10 is a top plan view of the example sprayer vehicle of FIG. 9, illustrating the attachment of the first wiring harness to the vehicle.

FIG. 9 illustrates connecting with the first wiring harness 1030 the one or more controllers 1020 with the plurality of electrically-actuatable solenoids 1010, while FIG. 10 illustrates attaching the first wiring harness 1030 to the vehicle 2000, including to the boom 2030, for instance with a plurality of zip-ties 1032 or other similar connection means, which may be provided as part of the kit 1000. First wiring harness 1030 may comprise a number of individual, separate, pig-tails or other suitable wiring members, or may comprise wiring members that are joined together at least in part, or both. The wire members of the first wire harness 1030 may be individually tailored in length to be suitable for a given installation along a laterally extending boom 2030 of known length range. First wiring harness 1030 may comprise suitable plugs on the ends of the wire members to facilitate easy plugging and un-plugging of the first wiring harness 1030 from vehicle 2000.

Figure 11:
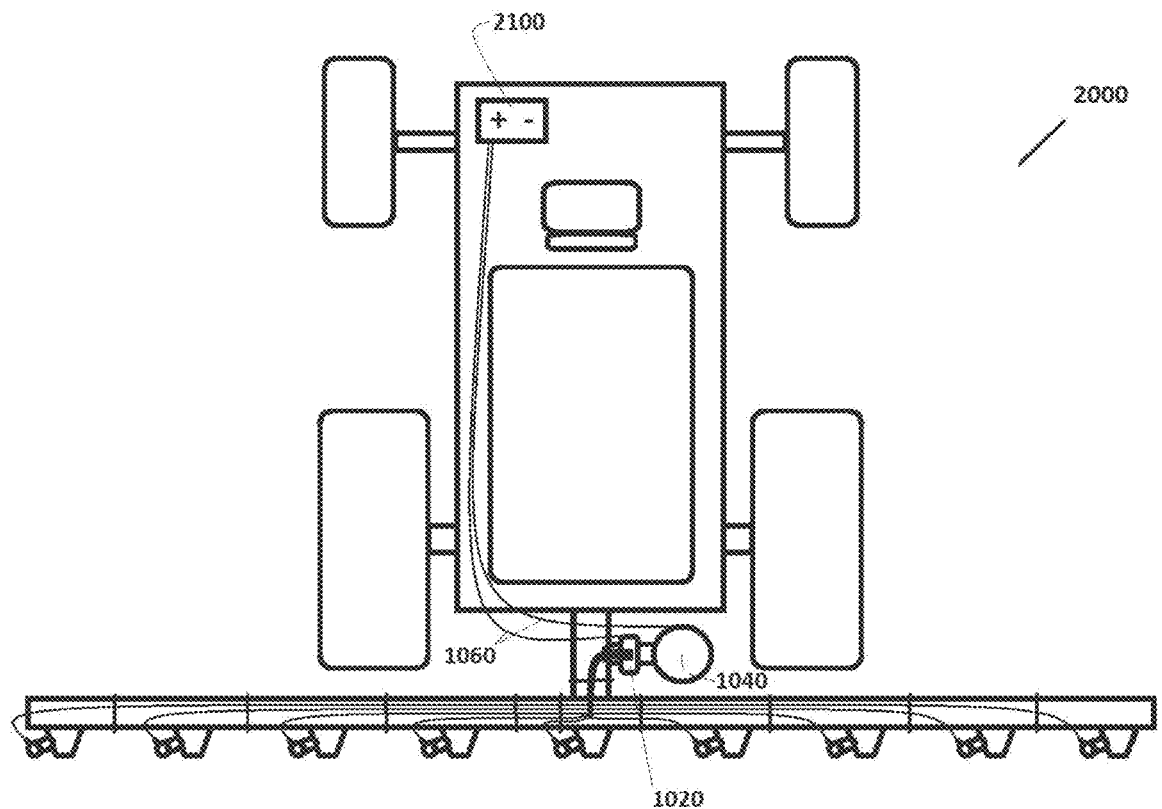
FIG. 11 is a top plan view of the example sprayer vehicle of FIG. 10, illustrating the addition of an example second wiring harness to connect the example one or more controllers and the example GPS antenna system to an example source of electrical power.
Figure 12:
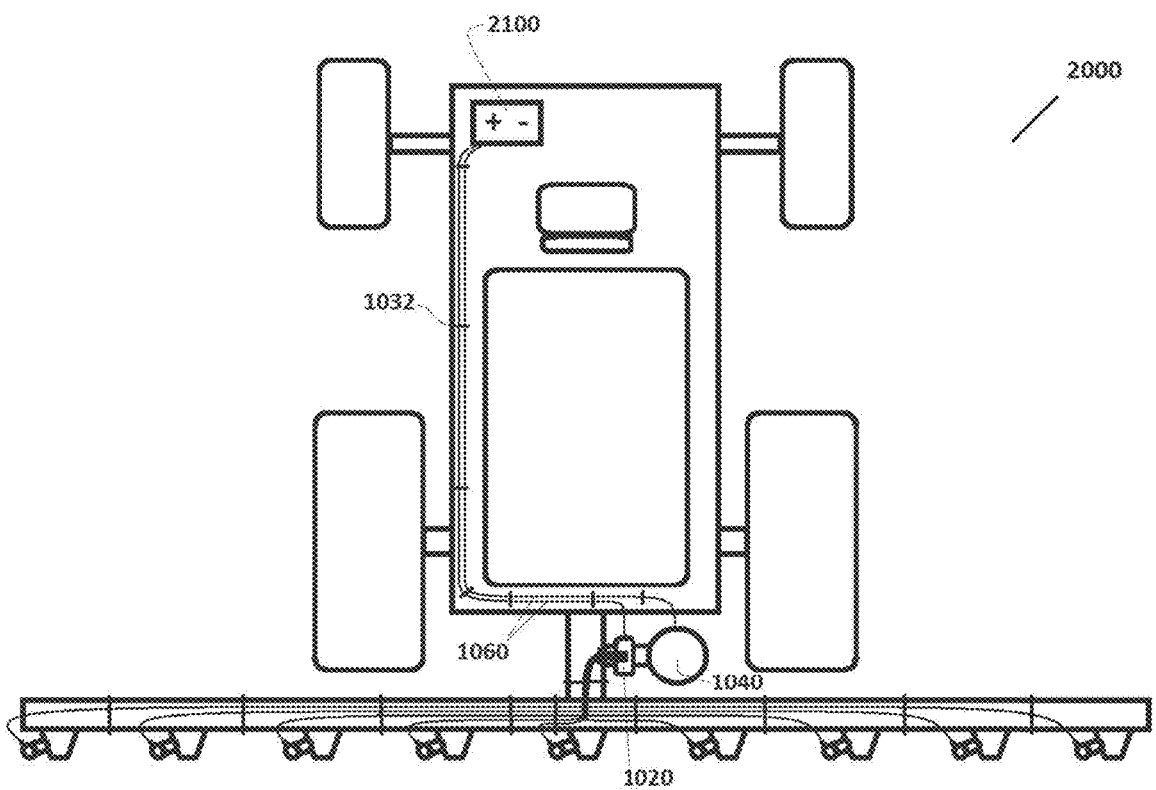
FIG. 12 is a top plan view of the example sprayer vehicle of FIG. 11, illustrating the attachment of the second wiring harness to the vehicle.

FIG. 11 illustrates connecting with the second wiring harness 1060 the one or more controllers 1020 and the GPS antenna system 1040 with the source of electrical power 2100, which may be located or electrically accessible at any location on the vehicle 2000, while FIG. 12 illustrates attaching the second wiring harness 1060 to the vehicle 2000, for instance with a plurality of zip-ties 1032 or other similar connection means, which may be provided as part of the kit 1000. Second wiring harness 1060 may comprise a number of individual, separate, wires, or may comprise wiring members that are joined together at least in part, or both. The wire members of the second wire harness 1060 may be individually tailored in length to be suitable for mounting the GPS antenna system 1040 at various adjustable heights above the one or more controllers 1020. Second wiring harness 1060 may comprise suitable plugs or other attachment means on or for the ends of the wire members to facilitate easy attachment and removal of the second wiring harness 1060 from vehicle 2000.

Figure 13:
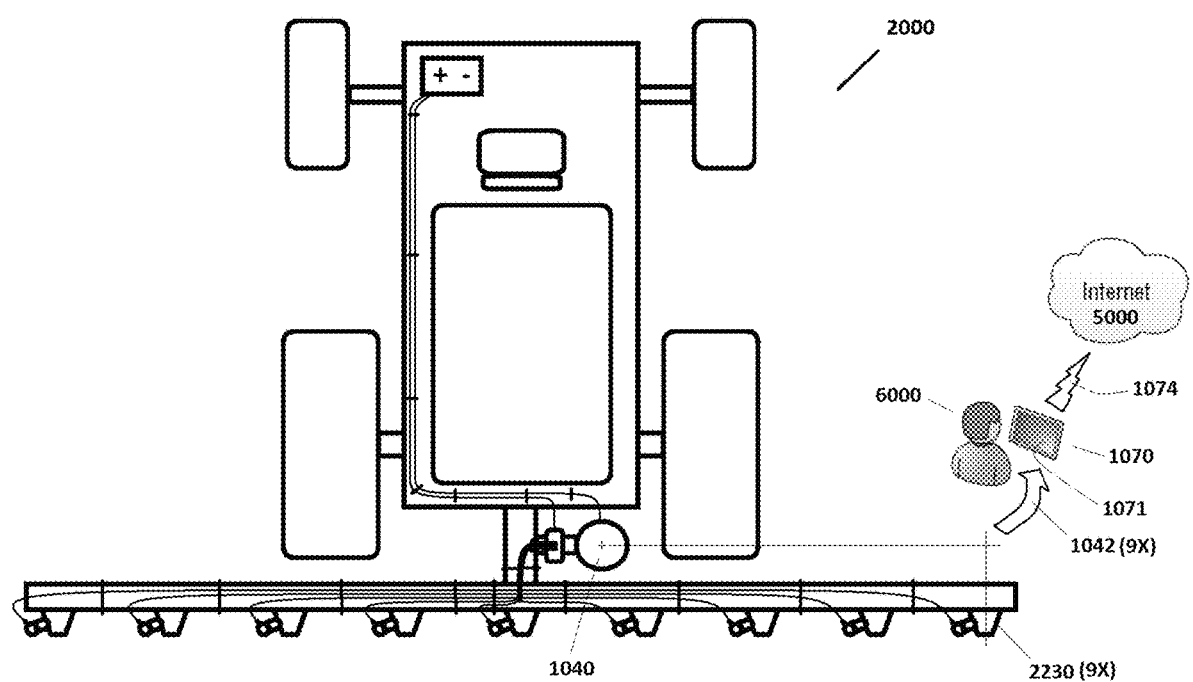
FIG. 13 is a top plan view of the example sprayer vehicle of FIG. 12, illustrating the steps of measuring and recording vehicle data regarding the relative locations of the nozzle assemblies with respect to the example GPS antenna system.

FIG. 13 illustrates a user 6000 using the screen or display 1071 of a mobile device 1070 to enter vehicle data 1042 into one or more databases (not shown), which may be located partially or entirely in the mobile device 1070, or partially or entirely remotely, such as in the cloud 5000 (i.e., on the Internet wirelessly accessible 1074 from the mobile device 1070). Vehicle data 1042 may include, for example, measurements (such as distances fore and aft, left and right) individually defining the dimensional locations of each of the nozzle assemblies 1010 relative to the location of the GPS antenna system 1040 when installed on the vehicle 2000. Mobile device 1070 can be any suitable electronic device that by itself or in conjunction with other devices, has the capacity to receive data input, store it, process it, and communicate data wirelessly (this includes by way of example and not limitation, smart phones, tablets, laptop computers, and any other suitable wireless electronics).

Figure 14:
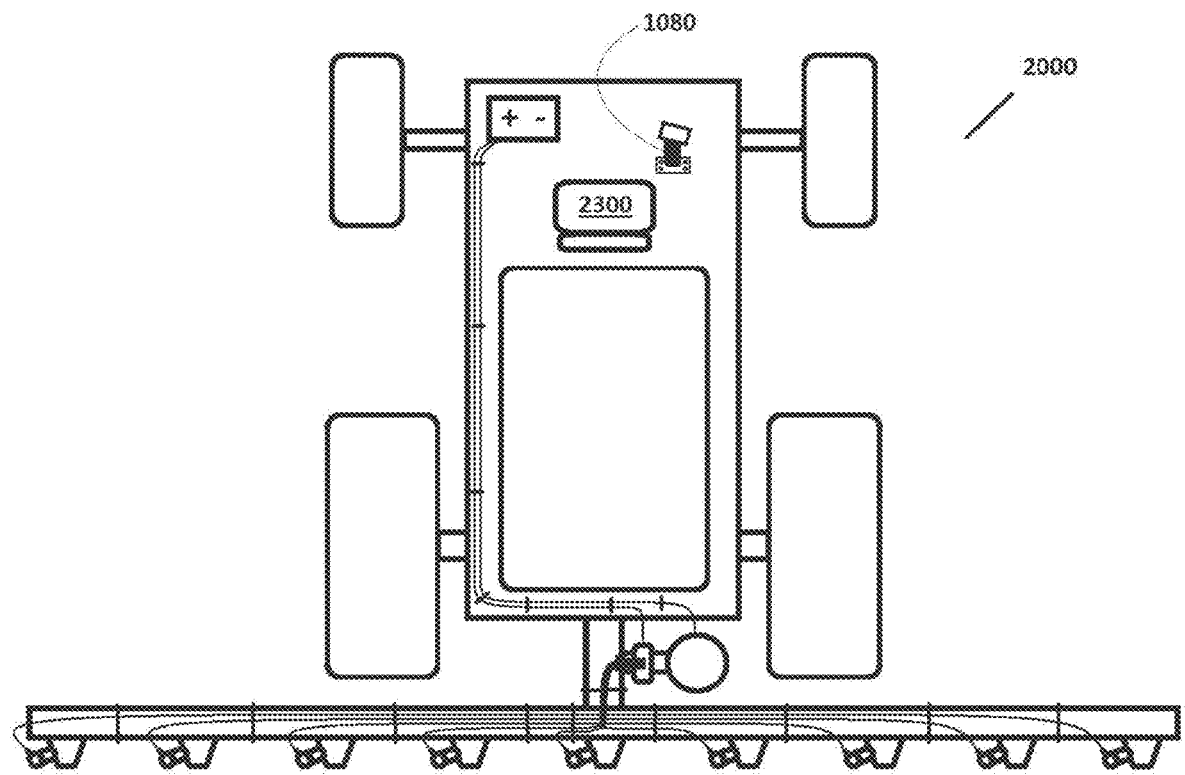
FIG. 14 is a top plan view of the example sprayer vehicle of FIG. 13, illustrating the addition of example second bracketry to a driver seating area of the vehicle.
Figure 15:
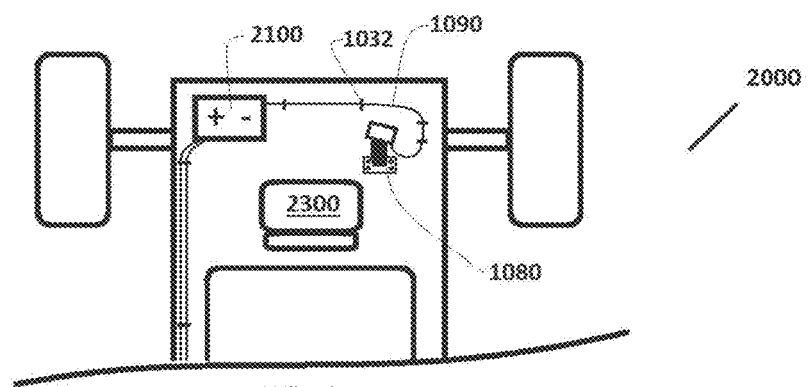
FIG. 15 is a partially cut-away top plan view of the example sprayer vehicle of FIG. 14, illustrating the addition of an example third wiring harness to connect example second bracketry to an example source of electrical power.
Figure 16:
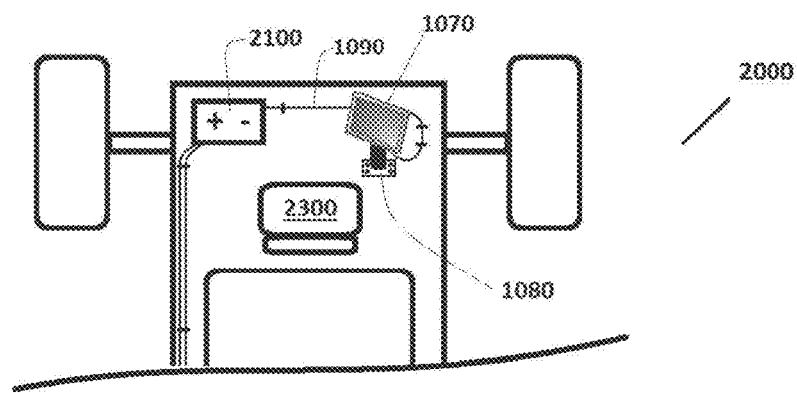
FIG. 16 is a partially cut-away top plan view of the example sprayer vehicle of FIG. 15, illustrating removably connecting a mobile device to the example second bracketry such that the mobile device can receive electrical power from the third wiring harness.

FIGS. 14, 15, and 16 illustrate mounting and wiring the mobile device 1070 proximate the driver's seating location 2300 in the vehicle 2000, so that the user 6000 can view or interact with the mobile device 1070, or both, while seated in the seating location 2300. Second bracketry 1080 may be provided and attached with the vehicle 2000 that is configured to attach the mobile device 1070 with the vehicle 2000 near a driver's location 2300 on the vehicle 2000. Second bracketry 1080 may provide for easy removal and replacement of the mobile device 1070 from the bracketry 1080, or may provide a locking or other mechanism to removably secure or protect or both, the mobile device 1070. A third wiring harness 1090 may be configured to be attached to the vehicle 2000 and to electrically connect the mobile device 1070 with the source of electrical power 2100, which may be located or electrically accessible at any location on the vehicle 2000, when the mobile device 1070 is attached with the vehicle 2000 near the driver's location 2300 on the vehicle 2000. FIG. 15 best illustrates attaching the third wiring harness 1090 to the vehicle 2000, for instance with a plurality of zip-ties 1032 or other similar connection means, which may be provided as part of the kit 1000. Third wiring harness 1090 may comprise a number of individual, separate, wires, or may comprise wiring members that are joined together at least in part, or both. Third wiring harness 1090 may comprise suitable plugs or other attachment means on or for the ends of the wire members to facilitate easy attachment and removal of the third wiring harness 1090 from vehicle 2000.

Figure 17:
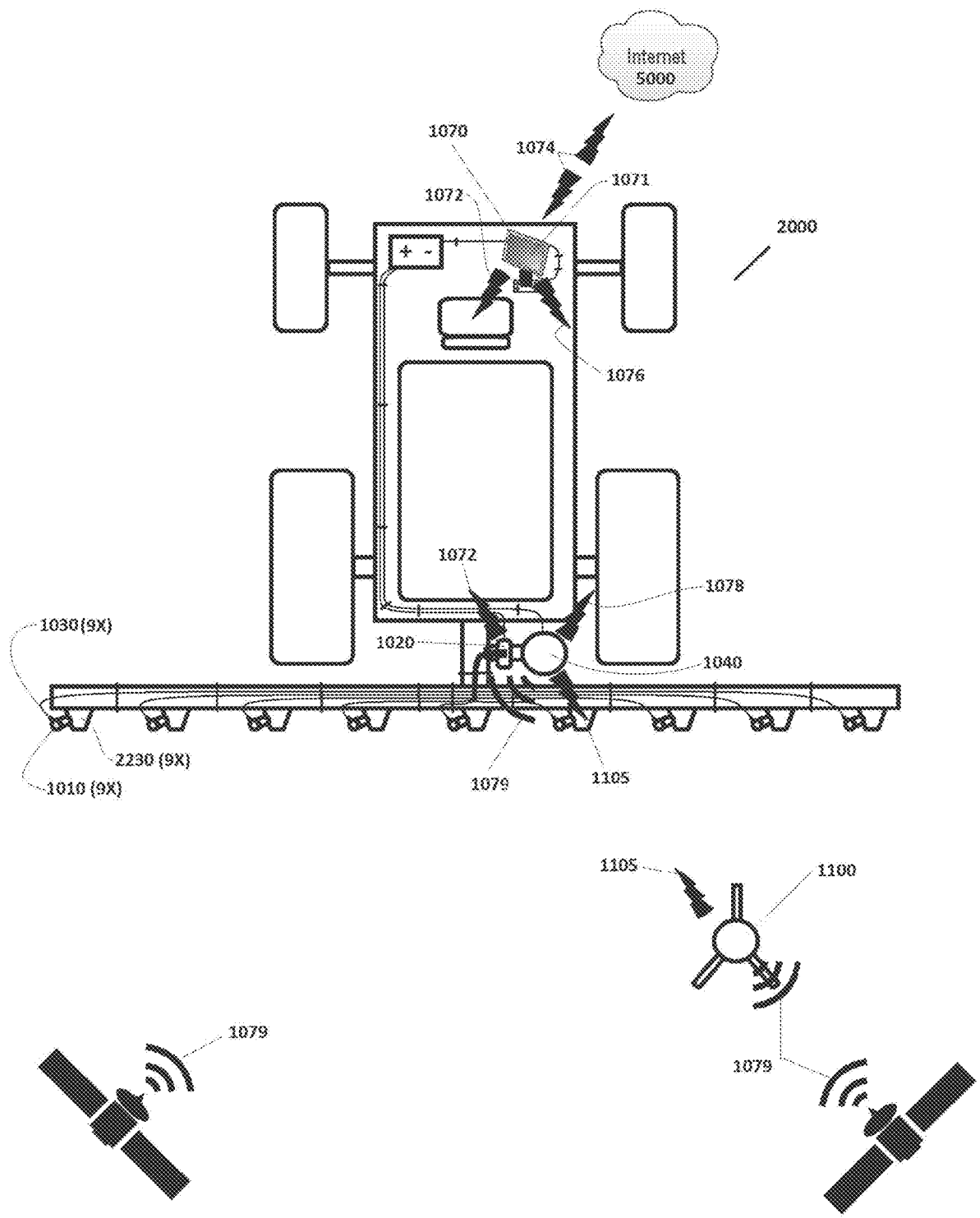
FIG. 17 is a top plan view of the example sprayer vehicle of FIG. 16, illustrating the example vehicle of FIG. 1A with an example kit according to various example embodiments installed and functioning on the vehicle.

FIG. 17 illustrates various example aspects of wireless and other communication that may be taking place on the vehicle 2000 once an example kit 1000 has been installed and is in-use. The GPS antenna system 1040 receives GPS satellite location signals 1079, typically from satellites in space. Optionally and absent in certain embodiments, the GPS antenna system 1040 may also receive correction radio frequency signals 1105 from a stationary differential ground station 1100, which may already exist nearly, or may be provided as part of the kit 1000 in certain example embodiments. The stationary differential ground station 1100 receives GPS satellite location signals 1079, typically from satellites in space, and send out a correction signal 1105 from a fixed location, which GPS antenna systems 1040 can use to correct their position readings. Further details regarding example GPS antenna systems 1040 is provided in the incorporated '139 application. Additional information regarding these types of GPS systems is provided in the Teach Patent, which is incorporated herein by reference.

With continuing reference to FIG. 17, the mobile device 1070 may communicate wirelessly 1076 with the GPS antenna system 1040, and may wirelessly receive geographic location information 1078 from the GPS antenna system 1040. Based on a real-time comparison of the geographic location information 1078 received from the GPS antenna system 1040 to boundary mapping information, which the mobile device 1070 may have obtained (or be obtaining in real-time) in a number of ways, including wirelessly 1074 from the Internet 5000, and based on vehicle data 1042 indicating where each nozzle assembly 2230 is located relative to the GPS antenna system 1040, the mobile device 1070 may determine whether each nozzle assembly 2230 is presently located in a spray region 3000 or a no-spray region 4000. Based on the outcome of that determination, the mobile device 1070 may wirelessly transmit on and off signals 1072 to the one or more controllers 1020, which then send signals through the first wiring harness 1030 to the corresponding electrically-actuatable solenoids 1010 to either turn on or turn off, respectively, the flow of the liquid 2220 through each nozzle assembly 2230. The user 6000, which may be the driver of the vehicle 2000, may in various example embodiments be able to view on the display or screen 1071 a dynamic map image depicting the real-time travel path and spraying coverage area of the vehicle 2000, including spray regions 3000, no-spray regions 4000, boundaries 3500 between those regions, and spray regions 3000 that have been sprayed and thus have become for the rest of that project or work day (or other period of time), no-spray regions 4000 for purposes of controlling the electrically-actuatable solenoids 1010 (but not necessarily for the purposes of map display). The figures, drawings, photographs, and detailed written description in the incorporated '139 application, including its own incorporations by reference, illustrate certain example aspects of a mobile device 1070 and its software and interface, wherein pages 000032 to 000098 provide example views and information regarding one or more screen interfaces as viewable by a user of an example system, pages 000099 to 000147 provide example views and information regarding an example web portal for use in connection with example system embodiments, and pages 000148 to 000182 provide example information regarding software that may be used in connection with example embodiments of the various components.

Figure 18:
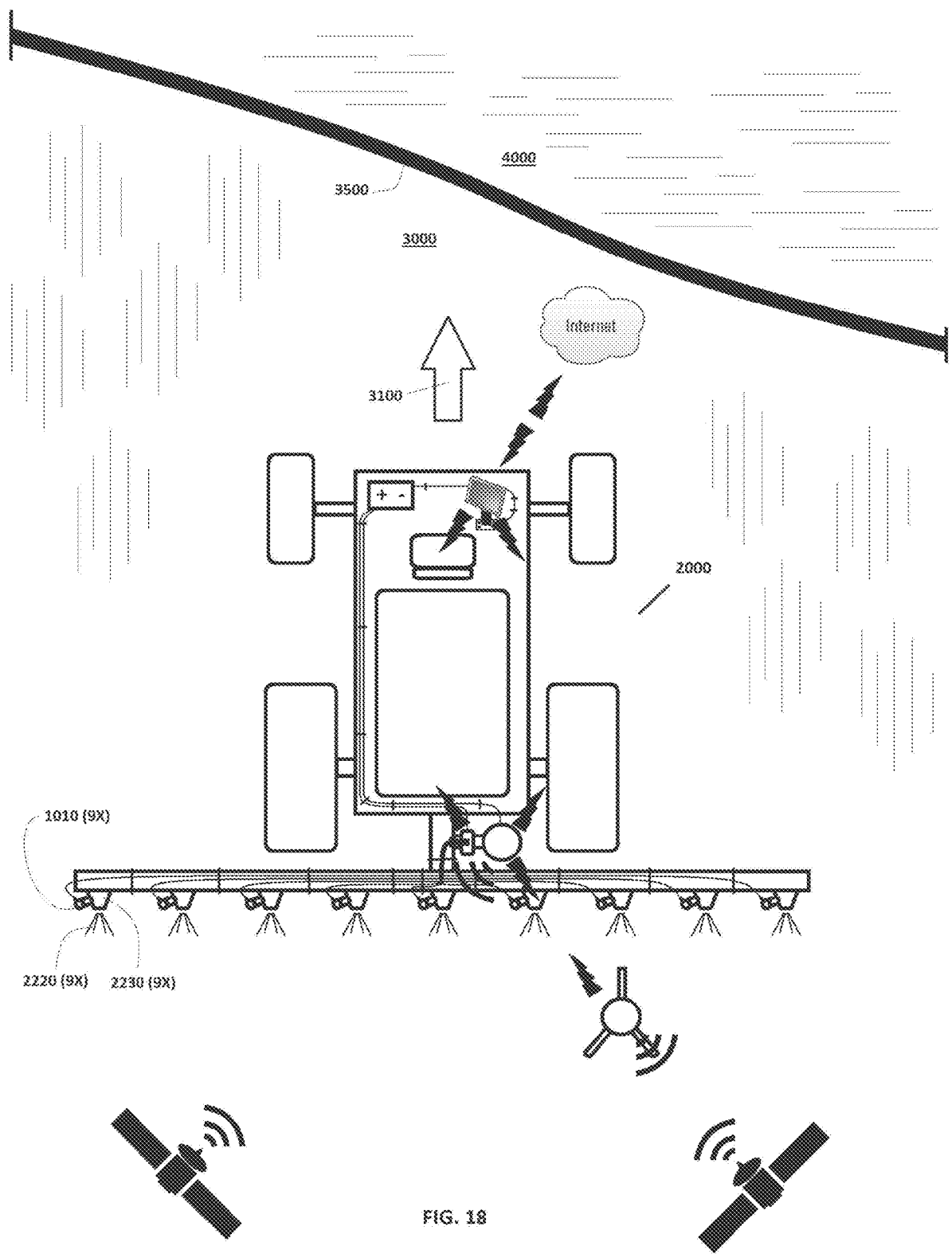
FIG. 18 is a top plan view of the example sprayer vehicle of FIG. 17, illustrating the vehicle located in a spray region and moving toward a no-spray region, with all nozzle assemblies spraying.

FIGS. 18-21 depict the vehicle 2000 with kit 1000 installed and in use as described with respect to FIG. 17. FIG. 18 shows the vehicle 2000 located in a spray region 3000 (indicated by shading marks running lengthwise up and down the page) and traveling in the direction of the arrow 3100 (forward) toward a no-spray region 4000 (indicated by shading marks running crosswise left and right across the page), and toward a digitally-defined border 3500 between the spray region 3000 and the no-spray region 4000. Since all of the nozzle assemblies 2230 on the vehicle 2000 in FIG. 18 are located within a spray region 3000, all the electrically-actuatable solenoids 1010 are turned on (or otherwise actuated) to allow the flow of the liquid 2220 through each nozzle assembly 2230.

Figure 19:
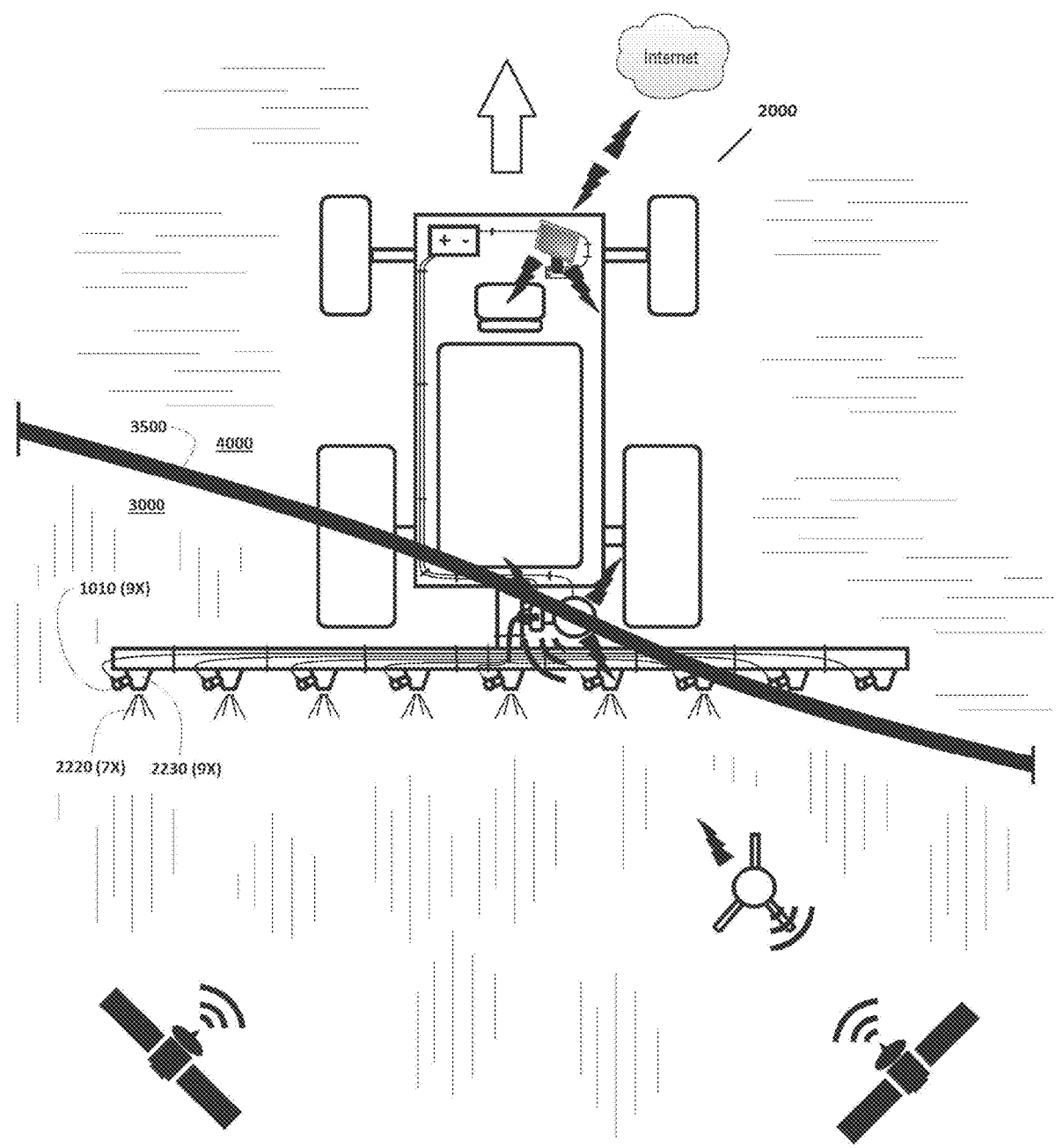
FIG. 19 is a top plan view of the example sprayer vehicle of FIG. 18, illustrating the vehicle moving across a boundary from the spray region into the no-spray region, with the nozzle assemblies still in the spray region spraying, and the nozzle assemblies in the no-spray region shut off.

FIG. 19 then shows the vehicle 2000 located partially in the spray region 3000 (indicated by shading marks running lengthwise up and down the page) and still traveling in the direction of the arrow toward and now partially through the no-spray region 4000 (indicated by shading marks running crosswise left and right across the page), and partially through the digitally-defined border 3500 between the spray region 3000 and the no-spray region 4000. Since now only seven of the nine nozzle assemblies 2230 on the vehicle 2000 in FIG. 18 are located within the spray region 3000 (while two of the nine nozzle assemblies 2230 are located within the no-spray region 4000), only the seven electrically-actuatable solenoids 1010 that are located within the spray region 3000 are turned on (or otherwise actuated) to allow the flow of the liquid 2220 through each of those seven nozzle assemblies 2230. The two electrically-actuatable solenoids 1010 that are located within the no-spray region 4000 are turned off (or otherwise actuated) to stop the flow of the liquid 2220 through those two nozzle assemblies 2230.

Figure 20:
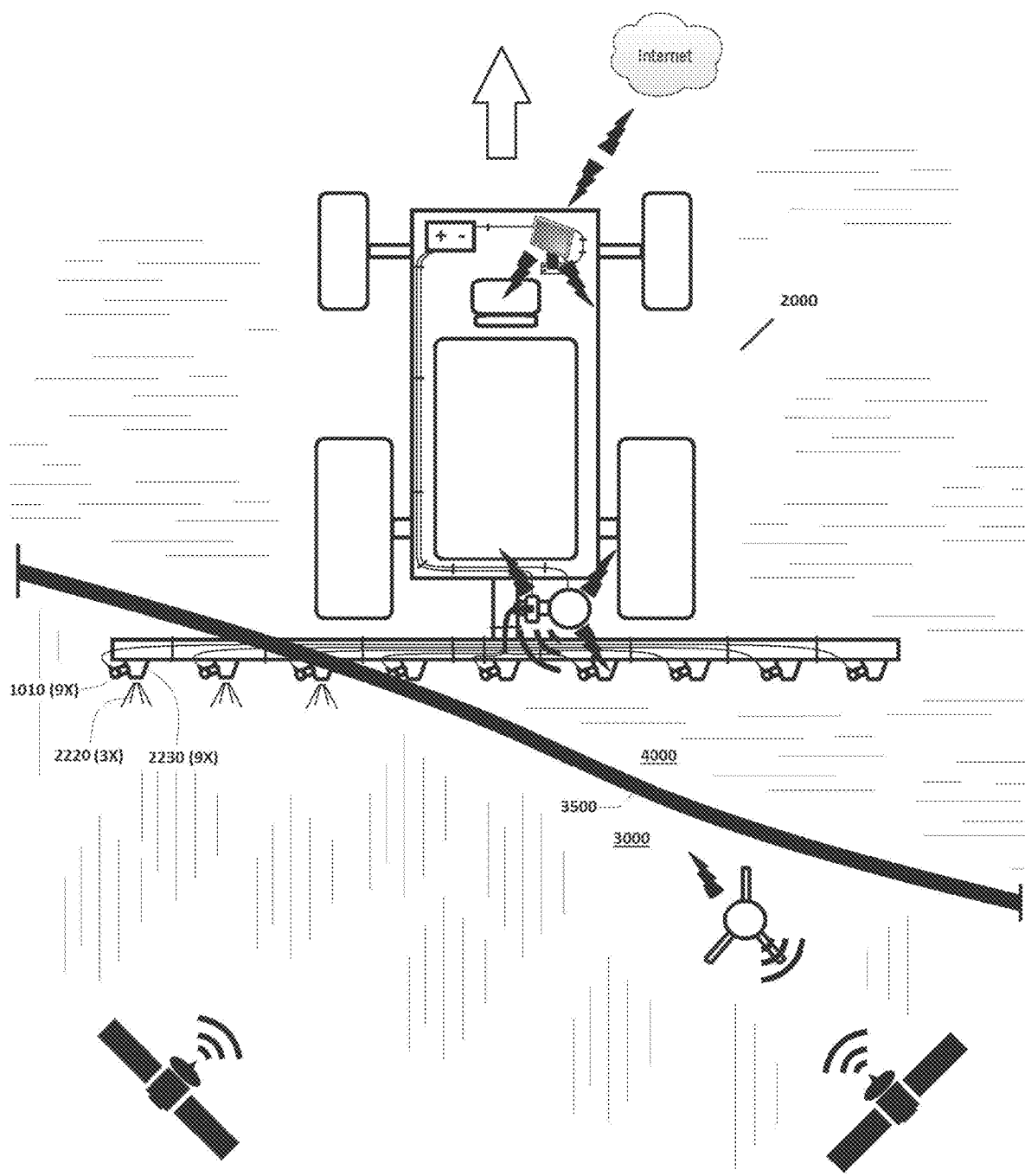
FIG. 20 is a top plan view of the example sprayer vehicle of FIG. 19, illustrating the vehicle moving further across the boundary from the spray region into the no-spray region, with the nozzle assemblies still in the spray region spraying, and the nozzle assemblies in the no-spray region shut off.

Next, FIG. 20 shows the vehicle 2000 departing the spray region 3000 (indicated by shading marks running lengthwise up and down the page) and still traveling in the direction of the arrow into the no-spray region 4000 (indicated by shading marks running crosswise left and right across the page), while crossing the digitally-defined border 3500 between the spray region 3000 and the no-spray region 4000. Since now only three of the nine nozzle assemblies 2230 on the vehicle 2000 in FIG. 18 are located within the spray region 3000 (while six of the nine nozzle assemblies 2230 are located within the no-spray region 4000), only the three electrically-actuatable solenoids 1010 that are located within the spray region 3000 are turned on (or otherwise actuated) to allow the flow of the liquid 2220 through each of those three nozzle assemblies 2230. The six electrically-actuatable solenoids 1010 that are located within the no-spray region 4000 are turned off (or otherwise actuated) to stop the flow of the liquid 2220 through those six nozzle assemblies 2230.

Figure 21:
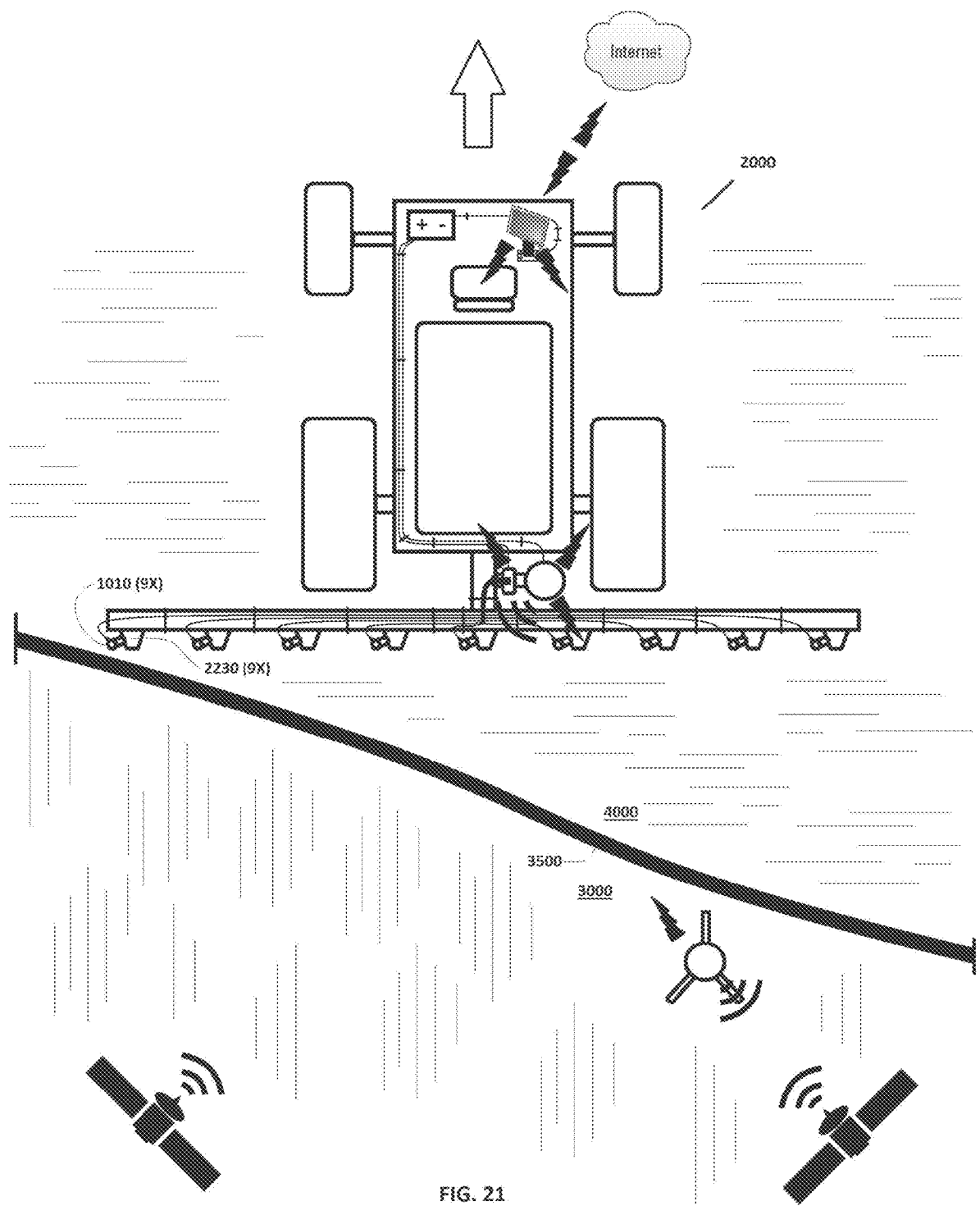
FIG. 21 is a top plan view of the example sprayer vehicle of FIG. 20, illustrating the vehicle having moved all the way across the boundary from the spray region into the no-spray region, with all the nozzle assemblies shut off since they are now all in the no-spray region.

Lastly FIG. 21 shows the vehicle 2000 having fully departed the spray region 3000 (indicated by shading marks running lengthwise up and down the page) and still traveling in the direction of the arrow entirely within the no-spray region 4000 (indicated by shading marks running crosswise left and right across the page). Since now none of the nine nozzle assemblies 2230 on the vehicle 2000 in FIG. 18 are located within the spray region 3000 (while all of the nine nozzle assemblies 2230 are located within the no-spray region 4000), none of the electrically-actuatable solenoids 1010 are located within the spray region 3000 so none are turned on (or otherwise actuated) to allow the flow of the liquid 2220 through their corresponding nozzle assemblies 2230. All nine electrically-actuatable solenoids 1010 are located within the no-spray region 4000 and are turned off (or otherwise actuated) to stop the flow of the liquid 2220 through all nine nozzle assemblies 2230.

With continuing reference hereafter to FIGS. 1-21 and the materials incorporated herein, various examples of the present kits, systems, and methods will now be further described. In various example embodiments a kit 1000 may be configured to be added-on to a vehicle 2000 having a source of electrical power 2100 and a spraying system 2200 comprising a tank 2210 for holding a liquid 2220 to be sprayed and a plurality of spaced-apart nozzle assemblies 2230 in liquid communication with the tank 2210, each nozzle assembly 2230 comprising a check valve 2240 removably installed in a port 2250 in each respective nozzle assembly 2230. Example kits 1000 may comprise a plurality of electrically-actuatable solenoids 1010 configured to be installed in the ports 2250 upon removal of the check valves 2240 and to selectably turn on (FIG. 1A) and off (FIG. 1B) flow of the liquid 2220 through the nozzle assemblies 2230 when the plurality of electrically-actuatable solenoids 1010 are installed in the ports 2250. Example kits 1000 may comprise one or more controllers 1020 configured to be in electrical communication with the plurality of electrically-actuatable solenoids 1010 and to electrically actuate the solenoids 1010 to selectably turn on (FIG. 1A) and off (FIG. 1B) of the liquid 2220 through the nozzle assemblies 2230 when the plurality of electrically-actuatable solenoids 1010 are installed in the ports 2250. Example kits 1000 may comprise a first wiring harness 1030 configured to be attached to the vehicle 2000 and to electrically connect the one or more controllers 1020 with the plurality of electrically-actuatable solenoids 1010. Example kits 1000 may comprise a GPS antenna system 1040. Example kits 1000 may comprise brackets 1050 configured to attach the GPS antenna system 1040 and the one or more controllers 1020 with the vehicle 2000. Example kits 1000 may comprise a second wiring harness 1060 configured to be attached to the vehicle 2000 and to electrically connect the one or more controllers 1020 and the GPS antenna system 1040 with the source of electrical power 2100. Example kits 1000 may comprise a mobile device 1070 configured to be in wireless communication with the GPS antenna system 1040 and the one or more controllers 1020, to receive geographic location information from the GPS antenna system 1040, and to process the geographic location information in view of one or more databases of information comprising map data defining spray regions 3000 and no-spray regions 4000 and vehicle data defining the locations of each of the nozzle assemblies 2230 relative to the location of the GPS antenna system 1040 when installed on the vehicle 2000, and based thereon wirelessly communicate on and off signals 1072 to the one or more controllers 1020 to individually turn on (FIG. 18) and off (FIG. 21) flow of the liquid 2220 through each of the individual nozzle assemblies 2230 based on whether each nozzle assembly 2230 is within a spray region 3000 or a no-spray region 4000. Example kits 1000 may comprise second bracketry 1080 configured to attach the mobile device 1070 with the vehicle 2000 near a driver's location 2300 on the vehicle 2000. Example kits 1000 may comprise a third wiring harness 1090 configured to be attached to the vehicle 2000 and to electrically connect the mobile device 1070 with the source of electrical power 2100 when the mobile device 1070 is attached with the vehicle 2000 near the driver's location 2300 on the vehicle 2000. In various example embodiments of kits 1000, the mobile device 1070 may be configured to update the map data in real-time during use of the vehicle 2000 to redefine the spray regions 3000 as no-spray regions 4000 as the spray regions 3000 are sprayed with the liquid 2220 by the vehicle 2000.

With continuing reference to FIGS. 1-21 and the materials incorporated herein, also provided in various example embodiments is a method of installing a kit 1000 as described herein, comprising the steps of: providing the vehicle 2000 and the kit 1000; removing the check valves 2240 from the ports 2250 in the nozzle assemblies 2230; installing the plurality of electrically-actuatable solenoids 1010 in the ports 2250; attaching with the bracketry 1050 the GPS antenna system 1040 and the one or more controllers 1020 with the vehicle 2000; connecting with the first wiring harness 1030 the one or more controllers 1020 with the plurality of electrically-actuatable solenoids 1010; attaching the first wiring harness 1030 to the vehicle 2000; connecting with the second wiring harness 1060 the one or more controllers 1020 and the GPS antenna system 1040 with the source of electrical power 2100; attaching the second wiring harness 1060 to the vehicle; and entering vehicle data into the one or more databases defining the locations of each of the nozzle assemblies 2230 relative to the location of the GPS antenna system 1040 when installed on the vehicle 2000. In various example embodiments a method of installing a kit 1000 as described herein may further comprise the steps of entering map data into the one or more databases defining spray regions 3000 and no-spray regions 4000. In various example embodiments the step of entering map data into the one or more databases defining spray regions and no-spray regions may comprise the steps of driving the vehicle 2000 along one or more edges 3500 of one or more spray regions 3000 or no-spray regions 4000 and recording travel path data transmitted from the GPS antenna system 1040 to the mobile device 1070, for instance as described in the '718 patent, incorporated herein by reference. In various example embodiments the step of entering map data into the one or more databases defining spray regions 3000 and no-spray regions 4000 may comprise the steps of directing a separate vehicle, such as a mapping cart, robot, or other vehicle having a second GPS antenna system (see the '718 patent and the references discussed therein), along one or more edges 3500 of one or more spray regions 3000 or no-spray regions 4000 and recording travel path data transmitted from the second GPS antenna system to the mobile device 1070. In various example embodiments the step of entering map data into the one or more databases defining spray regions 3000 and no-spray regions 4000 may comprise the steps of delineating one or more edges of one or more spray regions or no-spray regions on a GUI overlay of a digital image of a map, for instance as shown on pages 000063-000070 of the incorporated '139 application. In various example embodiments the step of entering map data into the one or more databases defining spray regions 3000 and no-spray regions 4000 may comprise the steps of downloading at least a portion of the map data wirelessly 1074 from the cloud 5000 to the mobile device 1070.

Further provided in various example embodiments is a vehicle 2000 having a source of electrical power 2100, and a spraying system 2200 comprising: a tank 2210 for holding a liquid 2220 to be sprayed (for instance as shown in FIG. 1A); a plurality of spaced-apart nozzle assemblies 2230 in liquid communication with the tank 2210, each nozzle assembly 2230 comprising an electrically-actuatable solenoid 1010 configured to selectably turn on and off flow of the liquid 2220 through the nozzle assembly 2230; one or more controllers 1020 in electrical communication with the plurality of electrically-actuatable solenoids 1010 and configured to electrically actuate the solenoids 1010 to selectably turn on and off flow of the liquid 2220 through the nozzle assemblies 2230; first wiring 1030 attached to the vehicle 2000 and electrically connecting the one or more controllers 1020 with the plurality of electrically-actuatable solenoids 1010; a GPS antenna system 1040; bracketry 1050 attaching the GPS antenna system 1040 and the one or more controllers 1020 with the vehicle 2000; second wiring 1060 attached to the vehicle 2000 and electrically connecting the one or more controllers 1020 and the GPS antenna system 1040 with the source of electrical power 2100; and a mobile device 1070 attached with the vehicle 2000 and in wireless communication 1076, 1072 with the GPS antenna system 1040 and the one or more controllers 1020, respectively, the mobile device 1070 configured to receive geographic location information 1078 from the GPS antenna system 1040 and to process the geographic location information 1078 in view of one or more databases of information comprising map data defining spray regions 3000 and no-spray regions 4000 and vehicle data defining the locations of each of the nozzle assemblies 2230 relative to the location of the GPS antenna system 1040, and based thereon wirelessly communicate on and off signals 1072 to the one or more controllers 1020 to individually turn on and off flow of the liquid 2220 through each of the individual nozzle assemblies 2230 based on whether each nozzle assembly 2230 is within a spray region 3000 or a no-spray region 4000. In various example embodiments the vehicle 2000 may further comprise second bracketry 1080 attaching the mobile device 1070 with the vehicle 2000 near a driver's location 2300 on the vehicle 2000, and wiring 1090 attached to the vehicle 2000 and electrically connecting the mobile device 1070 with the source of electrical power 2100. In various example embodiments the mobile device 1070 may be configured to update the map data in real-time during use of the vehicle 2000 to redefine the spray regions 3000 as no-spray regions 4000 as the spray regions 3000 are sprayed with the liquid 2220 by the vehicle 2000.

Additionally provided in various example embodiments is a method of using a vehicle 2000 as described herein, comprising the steps of providing the vehicle 2000 and causing the mobile device 1070 to, at a first time, wirelessly communicate signals 1072 to the one or more controllers 1020 to individually turn on or allow flow of the liquid 2220 through each of the individual nozzle assemblies 2230, and causing the mobile device 1070 to, at a second time, wirelessly communicate signals 1072 to the one or more controllers 1020 to individually turn off or disallow flow of the liquid 220 through each of the individual nozzle assemblies 2230.

In various example embodiments a method of using a vehicle 2000 as described herein may further comprise the steps of entering vehicle data 1042 into the one or more databases defining the locations of each of the nozzle assemblies 2230 relative to the location of the GPS antenna system 1040 when installed on the vehicle 2000. In various example embodiments the steps of entering vehicle data into the one or more databases may comprise the steps of entering map data into the one or more databases defining spray regions 3000 and no-spray regions 4000. In various example embodiments the steps of entering vehicle data into the one or more databases may comprise the steps of driving the vehicle 2000 along one or more edges 3500 of one or more spray regions 3000 or no-spray regions 4000 and recording travel path data transmitted from the GPS antenna system 1040 to the mobile device 1070, for instance as described in the '718 patent, incorporated herein by reference. In various example embodiments the steps of entering vehicle data into the one or more databases may comprise the steps of directing a vehicle, other than vehicle 2000, and having a second GPS antenna system (see the '718 patent and the references discussed therein), along one or more edges 3500 of one or more spray regions 3000 or no-spray regions 4000 and recording travel path data 1078 transmitted from the second GPS antenna system 1040 to the mobile device 1070. In various example embodiments the steps of entering vehicle data into the one or more databases may comprise the steps of delineating one or more edges of one or more spray regions or no-spray regions on a GUI overlay of a digital image of a map, for instance as shown on pages 000063-000070 of the incorporated '139 application. In various example embodiments the steps of entering vehicle data into the one or more databases may comprise the steps of delineating one or more edges of one or more spray regions or no-spray regions on a GUI overlay of a digital image of a map appearing on a screen 1071 of the mobile device 1070. In various example embodiments the steps of entering vehicle data into the one or more databases may comprise the steps of downloading at least a portion of the map data wirelessly 1074 from the cloud 5000 to the mobile device 1070.

In various example embodiments a method of using a vehicle 2000 as described herein may further comprise the steps of driving the vehicle 2000 proximate one or more edges 3500 of one or more spray regions 3000 or no-spray regions 4000 such that one or more of the plurality of spaced-apart nozzle assemblies 2230 are positioned within a spray region 3000 while other of the plurality of spaced-apart nozzle assemblies 2230 are positioned within a no-spray region 4000, and thereby causing the mobile device 1070 to wirelessly communicate signals 1072 to the one or more controllers 1020 to individually turn on or allow flow of the liquid 2220 through each of the individual nozzle assemblies 2230 positioned in the one or more spray regions 3000, and to individually turn off or disallow flow of the liquid 2220 through each of the individual nozzle assemblies 2230 positioned in the one or more no-spray regions 4000.

In various example embodiments a method of using a vehicle 2000 as described herein may further comprise the steps of driving the vehicle 2000 over a boundary 3500 between a spray region 3000 and a no-spray region 4000 such that at the first time the plurality of spaced-apart nozzle assemblies 2230 are all positioned within a spray region 3000, and at the second time after the first time the plurality of spaced-apart nozzle assemblies 2230 are all positioned within a no spray region 4000, and thereby causing, at the first time, the mobile device 1070 to wirelessly communicate signals 1072 to the one or more controllers 1020 to individually turn on or allow flow of the liquid 2220 through each of the individual nozzle assemblies 2230, and causing, at the second time, the mobile device 1070 to wirelessly communicate signals 1072 to the one or more controllers 1020 to individually turn off or disallow flow of the liquid 2220 through each of the individual nozzle assemblies 2230.

In various example embodiments a method of using a vehicle 2000 as described herein may further comprise the steps of updating the map data in real-time during use of the vehicle 2000 and redefining the spray regions 3000 as no-spray regions 4000 as the spray regions 3000 are sprayed with the liquid 2220 by the vehicle 2000. In various example embodiments a method of using a vehicle 2000 as described herein may further comprise the steps of viewing on a display (also referred to as a screen) 1071 on the mobile device 1070 a digital image of a map of an area where the vehicle 2000 is located, and within that map area, one or more boundaries 3500 between the one or more spray regions 3000 and the one or more no-spray regions 4000, and also dynamically depicting in real-time those portions of the map area which have been sprayed with the liquid 2220 by the spraying system 2200 and those portions of the map area which have not been sprayed with the liquid 2220 by the spraying system 2200 for instance as discussed and shown on pages 000088-000099 of the incorporated '139 application.

Any of the suitable technologies, materials, and designs set forth and incorporated herein may be used to implement various example aspects of the invention as would be apparent to one of skill in the art. Example embodiments of the present invention may optionally be implemented in combination with one or more aspects of the Intelligent Control Apparatus, System, and Method of Use discussed in U.S. Pat. No. 9,851,718 B2 to Steven R. Booher and issued Dec. 26, 2017 ("the '718 patent"), the entirety of which is incorporated herein by reference. For example and not by way of limitation, the entering of boundary data by directing a GPS equipped vehicle around the desired boundaries as described in the '718 patent, and the description of the Example Electronics Hardware in the '718 patent, may be applied to the present disclosure. Additionally, the features described in the incorporated '457 application may be incorporated into a vehicle 2000 as described herein, and the corresponding components described in the '457 application may be provided as part of kit 1000.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A method of installing a on a vehicle, comprising the steps of:
   providing a vehicle having a source of electrical power and a spraying system comprising a tank for holding a liquid to be sprayed and a plurality of spaced-apart nozzle assemblies in liquid communication with the tank, each nozzle assembly comprising a check valve removably installed in a port in each respective nozzle assembly;
   providing a kit configured to be added-on to the vehicle, the kit comprising:
      a plurality of electrically-actuatable solenoids configured to be installed in the ports upon removal of the check valves and to selectably turn on and off flow of the liquid through the nozzle assemblies when the plurality of electrically-actuatable solenoids are installed in the ports;
      one or more controllers configured to be in electrical communication with the plurality of electrically-actuatable solenoids and to electrically actuate the solenoids to selectably turn on and off flow of the liquid through the nozzle assemblies when the plurality of electrically-actuatable solenoids are installed in the ports;
      a first wiring harness configured to be attached to the vehicle and to electrically connect the one or more controllers with the plurality of electrically-actuatable solenoids;
      a GPS antenna system;
      bracketry configured to attach the GPS antenna system and the one or more controllers with the vehicle;
      a second wiring harness configured to be attached to the vehicle and to electrically connect the one or more controllers and the GPS antenna system with the source of electrical power; and
      a mobile device configured to be in wireless communication with the GPS antenna system and the one or more controllers, to receive geographic location information from the GPS antenna system, and to process the geographic location information in view of one or more databases of information comprising map data defining spray regions and no-spray regions and vehicle data defining the locations of each of the nozzle assemblies relative to the location of the GPS antenna system when installed on the vehicle, and based thereon wirelessly communicate on and off signals to the one or more controllers to individually turn on and off flow of the liquid through each of the individual nozzle assemblies based on whether each nozzle assembly is within a spray region or a no-spray region;
   removing the check valves from the ports in the nozzle assemblies;
   installing the plurality of electrically-actuatable solenoids in the ports;
   attaching with the bracketry the GPS antenna system and the one or more controllers with the vehicle;
   connecting with the first wiring harness the one or more controllers with the plurality of electrically-actuatable solenoids;
   attaching the first wiring harness to the vehicle;
   connecting with the second wiring harness the one or more controllers and the GPS antenna system with the source of electrical power;
   attaching the second wiring harness to the vehicle;
   entering vehicle data into the one or more databases defining the locations of each of the nozzle assemblies relative to the location of the GPS antenna system when installed on the vehicle.

2. The method of claim 1, further comprising the steps of:
entering map data into the one or more databases defining spray regions and no-spray regions.

3. The method of claim 2, wherein the step of entering map data into the one or more databases defining spray regions and no-spray regions comprises the steps of:

> driving the vehicle along one or more edges of one or more spray regions or no-spray regions and recording travel path data transmitted from the GPS antenna system to the mobile device.

4. The method of claim 2, wherein the step of entering map data into the one or more databases defining spray regions and no-spray regions comprises the steps of:

> directing a vehicle and having a second GPS antenna system, along one or more edges of one or more spray regions or no-spray regions and recording travel path data transmitted from the second GPS antenna system to the mobile device.

5. The method of claim 2, wherein the step of entering map data into the one or more databases defining spray regions and no-spray regions comprises the steps of:

> delineating one or more edges of one or more spray regions or no-spray regions on a GUI overlay of a digital image of a map.

6. The method of claim 2, wherein the step of entering map data into the one or more databases defining spray regions and no-spray regions comprises the steps of:

> downloading at least a portion of the map data wirelessly from the cloud to the mobile device.

* * * * *

UNITED STATES PATENT AND TRADEMARK OFFICE
CERTIFICATE OF CORRECTION

| | | |
|---|---|---|
| PATENT NO. | : 10,869,423 B2 | Page 1 of 1 |
| APPLICATION NO. | : 16/274833 | |
| DATED | : December 22, 2020 | |
| INVENTOR(S) | : Steven R. Booher, Gary A. Vandenbark and Mike Hillgoss | |

It is certified that error appears in the above-identified patent and that said Letters Patent is hereby corrected as shown below:

In the Claims

Column 17 Lines 62-63 Claim 1 should read:
1. A method of installing a kit on a vehicle, comprising the steps of:...

Signed and Sealed this
Eleventh Day of July, 2023

Katherine Kelly Vidal
*Director of the United States Patent and Trademark Office*